United States Patent
Hirai et al.

(10) Patent No.: US 6,778,222 B2
(45) Date of Patent: Aug. 17, 2004

(54) DATA BROADCAST APPARATUS FOR CONTROLLING PRESENTATION TIMING OF ADDITIONAL DATA WITH HIGH PRECISION

(75) Inventors: Junichi Hirai, Suita (JP); Akihiro Tanaka, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 366 days.

(21) Appl. No.: 09/824,469

(22) Filed: Apr. 2, 2001

(65) Prior Publication Data

US 2002/0021367 A1 Feb. 21, 2002

(30) Foreign Application Priority Data

Mar. 31, 2000 (JP) ........................................ 2000-097302

(51) Int. Cl.⁷ ............................ H04N 11/00; H04N 7/00
(52) U.S. Cl. ........................ 348/461; 348/467; 348/469; 725/135; 725/138; 725/146
(58) Field of Search ................................ 725/135, 136, 725/138, 114, 116, 91, 93, 144, 146; 348/461, 467, 471, 472, 469, 473, 474, 723; H04N 11/00, 7/00, 7/24

(56) References Cited

U.S. PATENT DOCUMENTS 5,978,855 A * 11/1999 Metz et al. ................. 709/249

| 6,446,262 | B1 | * | 9/2002 | Malaure et al. | 725/141 |
| 6,496,896 | B1 | * | 12/2002 | Inoue | 710/306 |
| 6,578,201 | B1 | * | 6/2003 | LaRocca et al. | 725/86 |
| 2003/0115612 | A1 | * | 6/2003 | Mao et al. | 725/136 |

FOREIGN PATENT DOCUMENTS

| EP | 827340 | 3/1998 |
| EP | 0 837 599 | 4/1998 |
| EP | 0 969 666 | 1/2000 |
| JP | 10126753 | 5/1998 |
| JP | 2000036946 | 2/2000 |
| WO | WO 99/65229 | 12/1999 |

* cited by examiner

Primary Examiner—Michael H. Lee
Assistant Examiner—Trang U. Tran

(57) ABSTRACT

A data broadcast apparatus repeatedly broadcasts broadcast data to a reception apparatus which stores the broadcast data into a memory and reproduces the broadcast data stored in the memory, according to a carousel method. An acquiring unit acquires a plurality of sets of broadcast data which each have a specified reproduction start time. A generating unit generates carousel data including the plurality of sets of broadcast data. A carousel data broadcasting unit repeatedly broadcasts the carousel data according to the carousel method, beginning at the earliest reproduction start time of the plurality of sets of broadcast data. An instruction broadcasting unit broadcasts, for each set of broadcast data, an instruction that indicates to the reception apparatus to start reproducing the set of broadcast data at a reproduction start time specified for the set of broadcast data.

12 Claims, 18 Drawing Sheets

FIG. 2
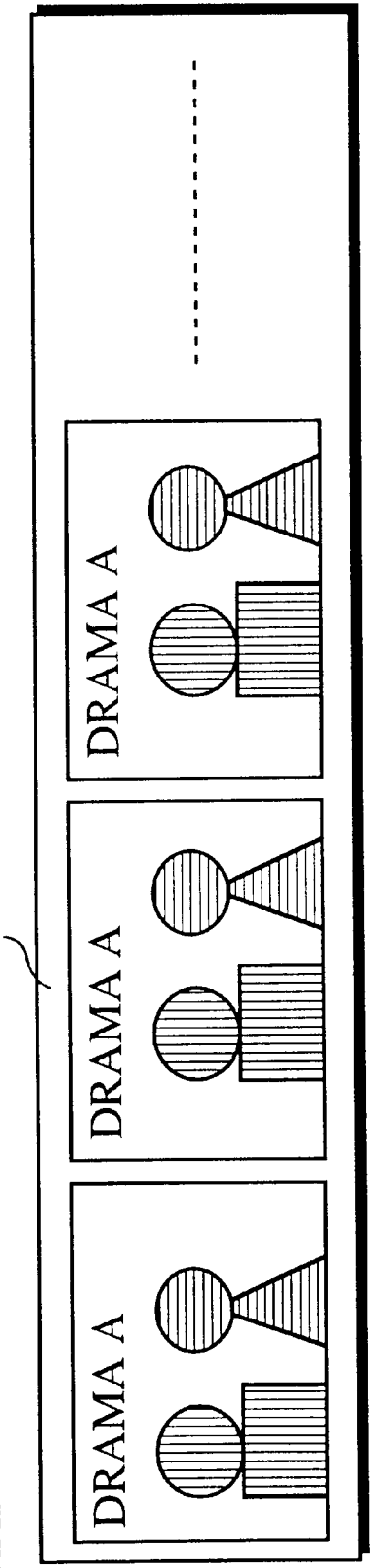
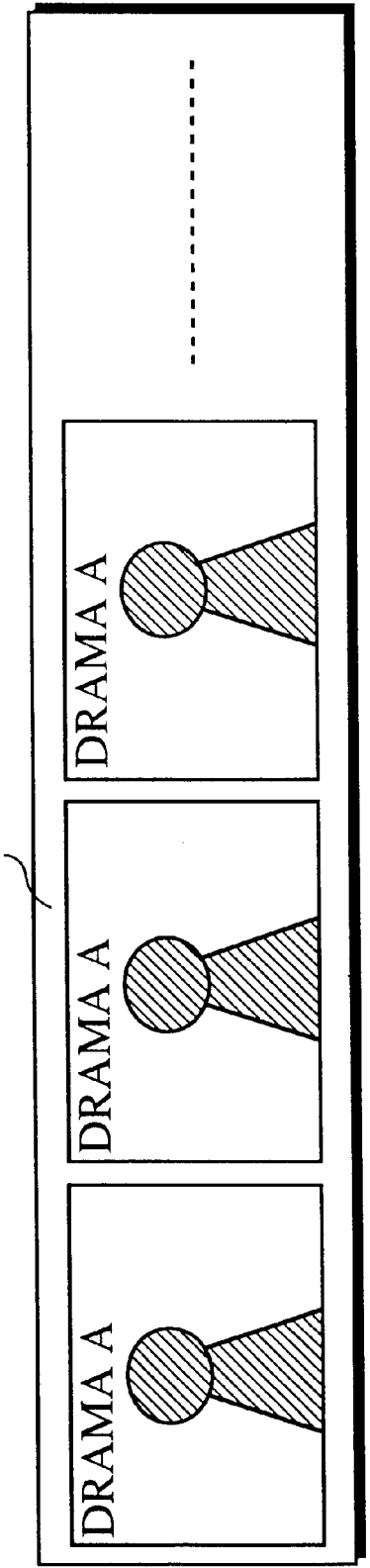

FIG. 3
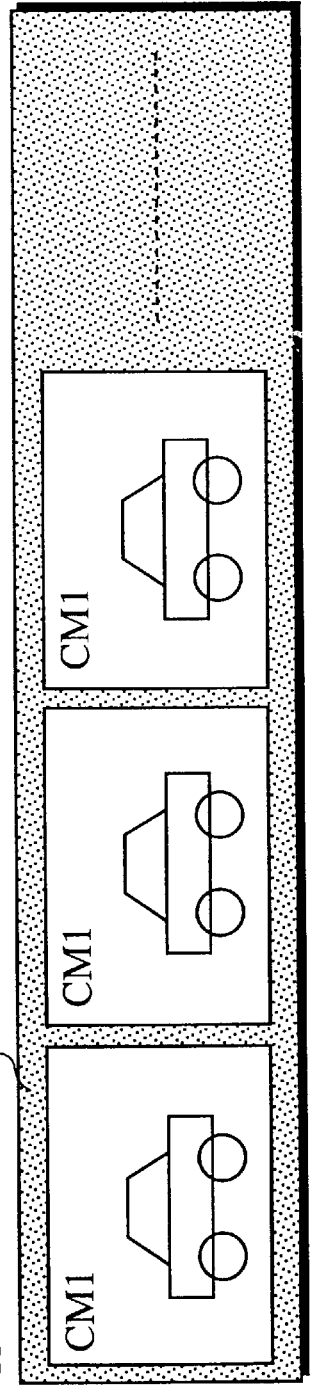
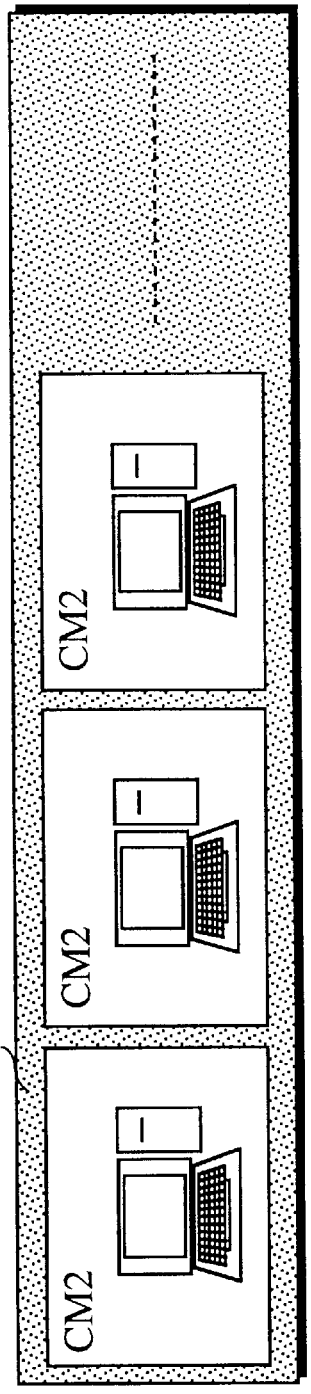
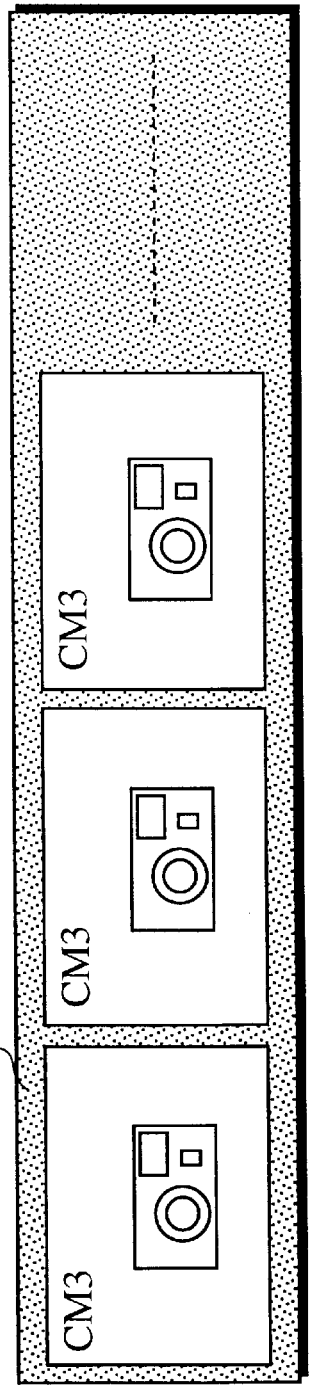

FIG. 8

PROGRAM SCHEDULING MANAGEMENT TABLE 800

| PROGRAM NAME | PROGRAM START TIME | PROGRAM END TIME | AV MATERIAL | DATA MATERIAL |
|---|---|---|---|---|
| DRAMA A | 10 : 00 : 00 | 11 : 00 : 00 | DRAMA A FIRST MATERIAL<br>DRAMA A SECOND MATERIAL<br>CM1 MATERIAL<br>CM2 MATERIAL<br>CM3 MATERIAL | DRAMA A ADDITIONAL DATA ①<br>DRAMA A ADDITIONAL DATA ②<br>DRAMA A ADDITIONAL DATA ③<br>CM1 ADDITIONAL DATA<br>CM2 ADDITIONAL DATA<br>CM3 ADDITIONAL DATA |

MATERIAL SCHEDULING MANAGEMENT TABLE 900

| PROGRAM NAME (901) | MATERIAL SWITCH TIME (902) | AV MATERIAL (903) | DATA MATERIAL (904) |
|---|---|---|---|
| DRAMA A | 00:00:00 | DRAMA A FIRST MATERIAL | DRAMA A ADDITIONAL DATA ① |
|  | 00:14:00 | CM1 MATERIAL | CM1 ADDITIONAL DATA |
|  | 00:14:15 | CM2 MATERIAL | CM2 ADDITIONAL DATA |
|  | 00:14:30 | DRAMA A SECOND MATERIAL | DRAMA A ADDITIONAL DATA ① |
|  | 00:29:45 | CM3 MATERIAL | CM3 ADDITIONAL DATA |

FIG. 11

DATA MATERIAL-MESSAGE ID CORRESPONDENCE TABLE 1100

| DATA MATERIAL NAME | MESSAGE ID |
|---|---|
| DRAMA A ADDITIONAL DATA ① | 100 |
| CM1 ADDITIONAL DATA | 101 |
| CM2 ADDITIONAL DATA | 102 |
| CM3 ADDITIONAL DATA | 103 |

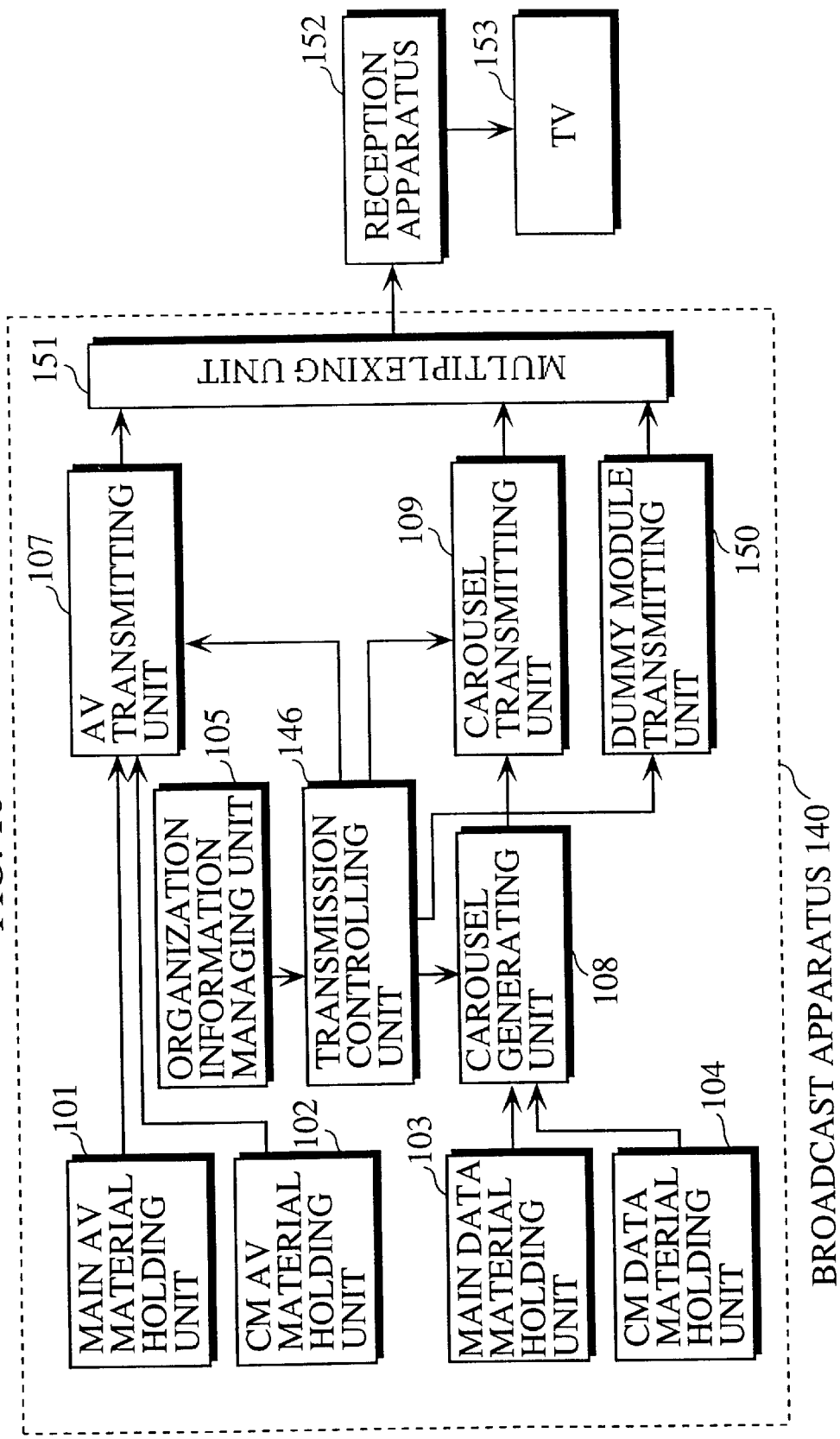

DATA BROADCAST APPARATUS FOR CONTROLLING PRESENTATION TIMING OF ADDITIONAL DATA WITH HIGH PRECISION

This application is based on an application No. 2000-097302 filed in Japan, the contents of which are hereby incorporated by reference.

BACKGROUND OF THE INVENTION

1. Field of the Invention

The present invention relates to a data broadcast apparatus that multiplexes additional data with data of a TV program and broadcast them so that the additional data is presented to a viewer with the TV program. The invention in particular relates to techniques of controlling presentation timing for additional data.

2. Related Art

In recent digital broadcasting, additional data such as character information is multiplexed with program data such as video and audio and broadcasted.

In general, the same or renewed additional data is repeatedly multiplexed with program data and broadcasted, with a cycle of about 5 to 10 seconds.

A data broadcast apparatus that performs such digital broadcasting is disclosed in Japanese Laid-Open Patent application No. H10-313449.

The most common method used for periodic broadcast of additional data is the Data Carousel (hereafter simply called "carousel method") specified by the internationally standardized DSM-CC (Digital Storage Media—Command and Control) (described in detail in Information Technology—Generic Coding of Moving Pictures and Associated Audio: DSM-CC—ISO/IEC 13818-6). Broadcast of additional data according to the carousel method has been adopted for BS digital broadcasting service and the like in Japan (described in detail in the ARIB STD-B24 specification "Data Broadcast Coding and Transmission in Digital Broadcasting").

With this method of repeatedly transmitting additional data, a reception apparatus can receive only necessary additional data and reproduce it, with it being possible to utilize enormous amounts of information without a large-capacity memory.

To renew additional data broadcasted using the carousel method, a method called carousel updating is employed. Carousel updating is a technique in which a broadcast apparatus estimates a time period required to receive the next additional data, and switches the broadcasting from the present additional data to the next additional data the estimated time period before a reception apparatus switches the presentation from the present additional data to the next additional data. This is described in detail in Japanese Laid-Open patent application No. H10-313449.

However, since there are variations in the time period required to receive additional data, the above technique has a problem that there is a large timing error for changing from the present additional data to the next additional data in the reception apparatus.

This timing error depends on the cycle in which additional data is repeatedly transmitted. For instance, when the cycle is 8 seconds, the time period taken to receive the additional data is about 8 seconds at the maximum but within 1 second at the minimum. In this case, there is a timing error of 7 seconds or more. With such a low degree of precision, the above technique is not applicable when presenting additional data of a commercial program with a short broadcast time period of about 15–30 seconds, though it is still applicable when presenting additional data of a main program with a long broadcast time period of 30 minutes or more.

SUMMARY OF THE INVENTION

The object of the present invention is to provide a data broadcast apparatus, method, and program that can control the timing of changing additional data presented to a viewer with greater precision.

The above object can be fulfilled by a data broadcast apparatus for repeatedly broadcasting broadcast data using a carousel method, to a reception apparatus which stores the broadcast data into a memory and reproduces the broadcast data stored in the memory, including: an acquiring unit for acquiring a plurality of sets of broadcast data for each of which a reproduction start time is specified; a generating unit for generating carousel data including the plurality of sets of broadcast data acquired by the acquiring unit; a carousel data broadcasting unit for repeatedly broadcasting the carousel data using the carousel method, beginning at an earliest reproduction start time out of a plurality of reproduction start times of the plurality of sets of broadcast data; and an instruction broadcasting unit for broadcasting, for each set of broadcast data, a reproduction instruction which indicates to the reception apparatus to start reproduction of the set of broadcast data at a reproduction start time specified for the set of broadcast data.

With this construction, broadcast data to be reproduced earlier and broadcast data to be reproduced later in the reception apparatus are repeatedly broadcasted together, and an instruction which indicates to start the reproduction of the latter broadcast data at a reproduction start time specified for the latter broadcast data is broadcasted.

Since the reception apparatus can store the latter broadcast data in a memory beforehand and reproduce it at the reproduction start time, there is almost no delay in reproduction caused by the time taken to receive the latter broadcast data. Thus, the broadcast apparatus can control the timing of changing broadcast data presented to a viewer, with greater precision.

Also, it becomes unnecessary to frequently change the contents of carousel data broadcasted, with it being possible to lighten the burden on the broadcast apparatus.

Here, the instruction broadcasting unit may further broadcast a storage instruction which indicates to the reception apparatus to store the set of broadcast data into the memory before the reproduction start time.

With this construction, an instruction which indicates to store the latter broadcast data into the memory before the reproduction start time is broadcasted.

Accordingly, the reception apparatus can store necessary broadcast data only when required, with it being possible to economize memory usage in the reception apparatus.

Here, the instruction broadcasting unit may further broadcast a deletion instruction which indicates to the reception apparatus that the set of broadcast data can be deleted from the memory after the reproduction ends.

With this construction, an instruction which indicates that the latter broadcast data can be deleted from the memory after the reproduction ends is broadcasted.

Accordingly, the reception apparatus can delete from the memory broadcast data which becomes unnecessary, with it being possible to economize memory usage in the reception apparatus.

Here, the instruction broadcasting unit may broadcast the reproduction instruction as an event message or a module which has a particular identifier.

With this construction, the instruction to start the reproduction of the latter broadcast data is broadcasted as an event message or a module having a particular identifier.

This makes it possible to implement the invention with conventional reception apparatuses.

The above object can also be fulfilled by a data broadcast apparatus for (a) continuously broadcasting program data during a broadcast time slot to a reception apparatus, and (b) repeatedly broadcasting additional data associated with the program data during the broadcast time slot using a carousel method, to the reception apparatus which stores the additional data into a memory and reproduces the additional data stored in the memory, including: an acquiring unit for acquiring a plurality of sets of program data for each of which a broadcast time slot is specified, and a plurality of sets of additional data which are respectively associated with the plurality of sets of program data; a generating unit for generating carousel data including the plurality of sets of additional data acquired by the acquiring unit; a data broadcasting unit for (a) continuously broadcasting, during a broadcast time slot of each set of program data, the set of program data, and (b) repeatedly broadcasting the carousel data using the carousel method, beginning at the start of an earliest broadcast time slot of a plurality of broadcast time slots of the plurality of sets of program data; and an instruction broadcasting unit for broadcasting, for each set of additional data, a reproduction instruction which indicates to the reception apparatus to start reproduction of the set of additional data at the start of a broadcast time slot specified for a set of program data associated with the set of additional data.

With this construction, additional data to be reproduced earlier and additional data to be reproduced later in the reception apparatus are repeatedly broadcasted together, and an instruction which indicates to start the reproduction of the latter additional data at the start of a broadcast time slot specified for program data associated with the latter additional data is broadcasted.

Since the reception apparatus can store the latter additional data in a memory beforehand and reproduce it at the start of the broadcast time slot, there is almost no delay in reproduction caused by the time taken to receive the latter additional data. Thus, the broadcast apparatus can control the timing of changing additional data presented to a viewer, with greater precision.

Here, the instruction broadcasting unit may further broadcast a storage instruction which indicates to the reception apparatus to store the set of additional data into the memory before the start of the broadcast time slot.

With this construction, an instruction which indicates to store the latter additional data into the memory before the start of the broadcast time slot is broadcasted.

Accordingly, the reception apparatus can store necessary additional data only when required, with it being possible to economize memory usage in the reception apparatus.

Here, the instruction broadcasting unit may further broadcast a deletion instruction which indicates to the reception apparatus that the set of additional data can be deleted from the memory after the reproduction ends.

With this construction, an instruction which indicates that the latter additional data can be deleted from the memory after the reproduction ends is broadcasted.

Accordingly, the reception apparatus can delete from the memory additional data which becomes unnecessary, with it being possible to economize memory usage in the reception apparatus.

Here, the instruction broadcasting unit may broadcast the reproduction instruction as an event message or a module which has a particular identifier.

With this construction, the instruction to start the reproduction of the latter additional data is broadcasted as an event message or a module having a particular identifier.

This makes it possible to implement the invention with conventional reception apparatuses.

The above object can also be fulfilled by a computer program embodied on a computer readable medium for use with a computer, for repeatedly broadcasting broadcast data using a carousel method to a reception apparatus which stores the broadcast data into a memory and reproduces the broadcast data stored in the memory, the computer program including: an acquiring step for acquiring a plurality of sets of broadcast data for each of which a reproduction start time is specified; a generating step for generating carousel data including the plurality of sets of broadcast data acquired in the acquiring step; a carousel data broadcasting step for repeatedly broadcasting the carousel data using the carousel method, beginning at an earliest reproduction start time out of a plurality of reproduction start times of the plurality of sets of broadcast data; and an instruction broadcasting step for broadcasting, for each set of broadcast data, a reproduction instruction which indicates to the reception apparatus to start reproduction of the set of broadcast data at a reproduction start time specified for the set of broadcast data.

The above object can also be fulfilled by a data broadcast method for repeatedly broadcasting broadcast data using a carousel method to a reception apparatus which stores the broadcast data into a memory and reproduces the broadcast data stored in the memory, the data broadcast method including: an acquiring step for acquiring a plurality of sets of broadcast data for each of which a reproduction start time is specified; a generating step for generating carousel data including the plurality of sets of broadcast data acquired in the acquiring step; a carousel data broadcasting step for repeatedly broadcasting the carousel data using the carousel method, beginning at an earliest reproduction start time out of a plurality of reproduction start times of the plurality of sets of broadcast data; and an instruction broadcasting step for broadcasting, for each set of broadcast data, a reproduction instruction which indicates to the reception apparatus to start reproduction of the set of broadcast data at a reproduction start time specified for the set of broadcast data.

With these constructions, broadcast data to be reproduced earlier and broadcast data to be reproduced later in the reception apparatus are repeatedly broadcasted together, and an instruction which indicates to start the reproduction of the latter broadcast data at a reproduction start time specified for the latter broadcast data is broadcasted.

Since the reception apparatus can store the latter broadcast data in a memory beforehand and reproduce it at the reproduction start time, there is almost no delay in reproduction caused by the time taken to receive the latter broadcast data. Thus, the broadcast apparatus can control the timing of changing broadcast data presented to a viewer, with greater precision. The above object can also be fulfilled by a computer program embodied on a computer readable medium for use with a computer, for repeatedly broadcasting broadcast data using a carousel method to a reception apparatus which stores the broadcast data into a memory and reproduces the broadcast data stored in the memory, the computer program including: an acquiring step for acquiring a plurality of sets of program data for each of which a broadcast time slot is specified, and a plurality of sets of additional data which are respectively associated with the plurality of sets of program data; a generating step for generating carousel data including the plurality of sets of additional data acquired in the acquiring step; a data broadcasting step for (a) continuously broadcasting, during a broadcast time slot of each set of program data, the set of program data, and (b) repeatedly broadcasting the carousel data using the carousel method, beginning at the start of an earliest broadcast time slot of a plurality of broadcast time slots of the plurality of sets of program data; and an instruction broadcasting step for broadcasting, for each set of additional data, a reproduction instruction which indicates to the reception apparatus to start reproduction of the set of additional data at the start of a broadcast time slot specified for a set of program data associated with the set of additional data.

The above object can also be fulfilled by a data broadcast method for repeatedly broadcasting broadcast data using a carousel method to a reception apparatus which stores the broadcast data into a memory and reproduces the broadcast data stored in the memory, the data broadcast method including: an acquiring step for acquiring a plurality of sets of program data for each of which a broadcast time slot is specified, and a plurality of sets of additional data which are respectively associated with the plurality of sets of program data; a generating step for generating carousel data including the plurality of sets of additional data acquired in the acquiring step; a data broadcasting step for (a) continuously broadcasting, during a broadcast time slot of each set of program data, the set of program data, and (b) repeatedly broadcasting the carousel data using the carousel method, beginning at the start of an earliest broadcast time slot of a plurality of broadcast time slots of the plurality of sets of program data; and an instruction broadcasting step for broadcasting, for each set of additional data, a reproduction instruction which indicates to the reception apparatus to start reproduction of the set of additional data at the start of a broadcast time slot specified for a set of program data associated with the set of additional data.

With these constructions, additional data to be reproduced earlier and additional data to be reproduced later in the reception apparatus are repeatedly broadcasted together, and an instruction which indicates to start the reproduction of the latter additional data at the start of a broadcast time slot specified for program data associated with the latter additional data is broadcasted.

Since the reception apparatus can store the latter additional data in a memory beforehand and reproduce it at the start of the broadcast time slot, there is almost no delay in reproduction caused by the time taken to receive the latter additional data.

Thus, the broadcast apparatus can control the timing of changing additional data presented to a viewer, with greater precision.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 2 shows an example of AV materials of a main program which are held in a program AV material holding unit shown in FIG. 1;

FIG. 3 shows an example of AV materials of CM programs which are held in a CM AV material holding unit shown in FIG. 1;

FIGS. 8 and 9 each show an example of organization information managed in an organization information managing unit shown in FIG. 1;

FIG. 11 shows an example of a data material—message ID correspondence table;

FIG. 18 is a block diagram showing a construction of a broadcast system to which a modification of the invention relates.

DESCRIPTION OF THE PREFERRED EMBODIMENT(S)

First Embodiment (Overview)

In the first embodiment of the present invention, a broadcast apparatus repeatedly broadcasts main program additional data which should be presented to a viewer with a main program and commercial (CM) program additional data which should be presented to the viewer with a CM program inserted in the main program, beginning at the broadcast start time of the main program. The broadcast apparatus also broadcasts an indication to switch from the main program additional data to the CM program additional data, at the broadcast start time of the CM program.

A reception apparatus receives the CM program additional data and stores it in a memory before the broadcast start time of the CM program. On receiving the indication to switch to the CM program additional data, the reception apparatus stops presenting the main program additional data and starts presenting the CM program additional data stored in the memory.

(Construction)

Figure 1:
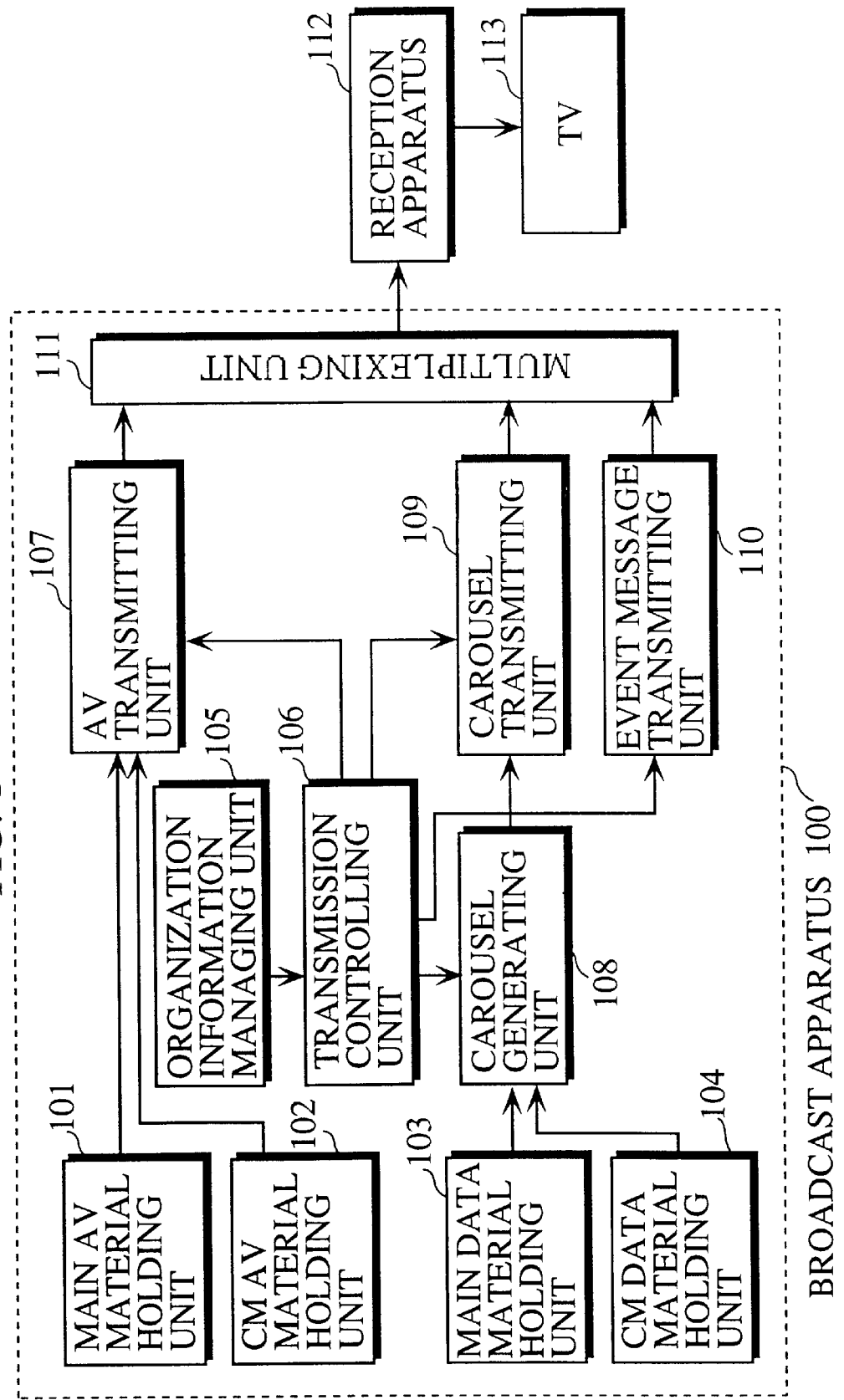
FIG. 1 is a block diagram showing a construction of a broadcast system to which the first embodiment of the invention relates.

FIG. 1 is a block diagram of a construction of a broadcast system to which the first embodiment of the invention relates.

This broadcast system is roughly made up of a broadcast apparatus 100 and a reception apparatus 112.

The drawing also shows a TV 113 for presenting programs and data to the viewer based on a data broadcast received by the reception apparatus 112.

The broadcast apparatus 100 includes a main AV material holding unit 101, a CM AV material holding unit 102, a main data material holding unit 103, a CM data material holding unit 104, an organization information managing unit 105, a transmission controlling unit 106, an AV transmitting unit 107, a carousel generating unit 108, a carousel transmitting unit 109, an event message transmitting unit 110, and a multiplexing unit 111.

The main AV material holding unit 101, the CM AV material holding unit 102, the main data material holding unit 103, and the CM data material holding unit 104 can be implemented by a commercially available VCR or video server.

The main AV material holding unit 101 holds AV materials for a main program. An AV material referred to here is a material of program data which is made up of video, audio, and other information of a program.

FIG. 2 shows an example of main program AV materials held in the main AV material holding unit 101.

In the drawing, a drama A first material 201 is an AV material used in the first part of a main program titled "drama A", whereas a drama A second material 202 is an AV material used in the latter part of the main program "drama A".

The CM AV material holding unit 102 holds AV materials for CM programs.

FIG. 3 shows an example of CM program AV materials held in the CM AV material holding unit 102.

In the drawing, a CM1 material 301 is an AV material of a CM program advertising a car, a CM2 material 302 is an AV material of a CM program advertising a personal computer, and a CM3 material 303 is an AV material of a CM program advertising a digital camera.

The main data material holding unit 103 holds data materials for the main program. A data material referred to here is a material of additional data which is made up of detailed information about a program.

Figure 4:
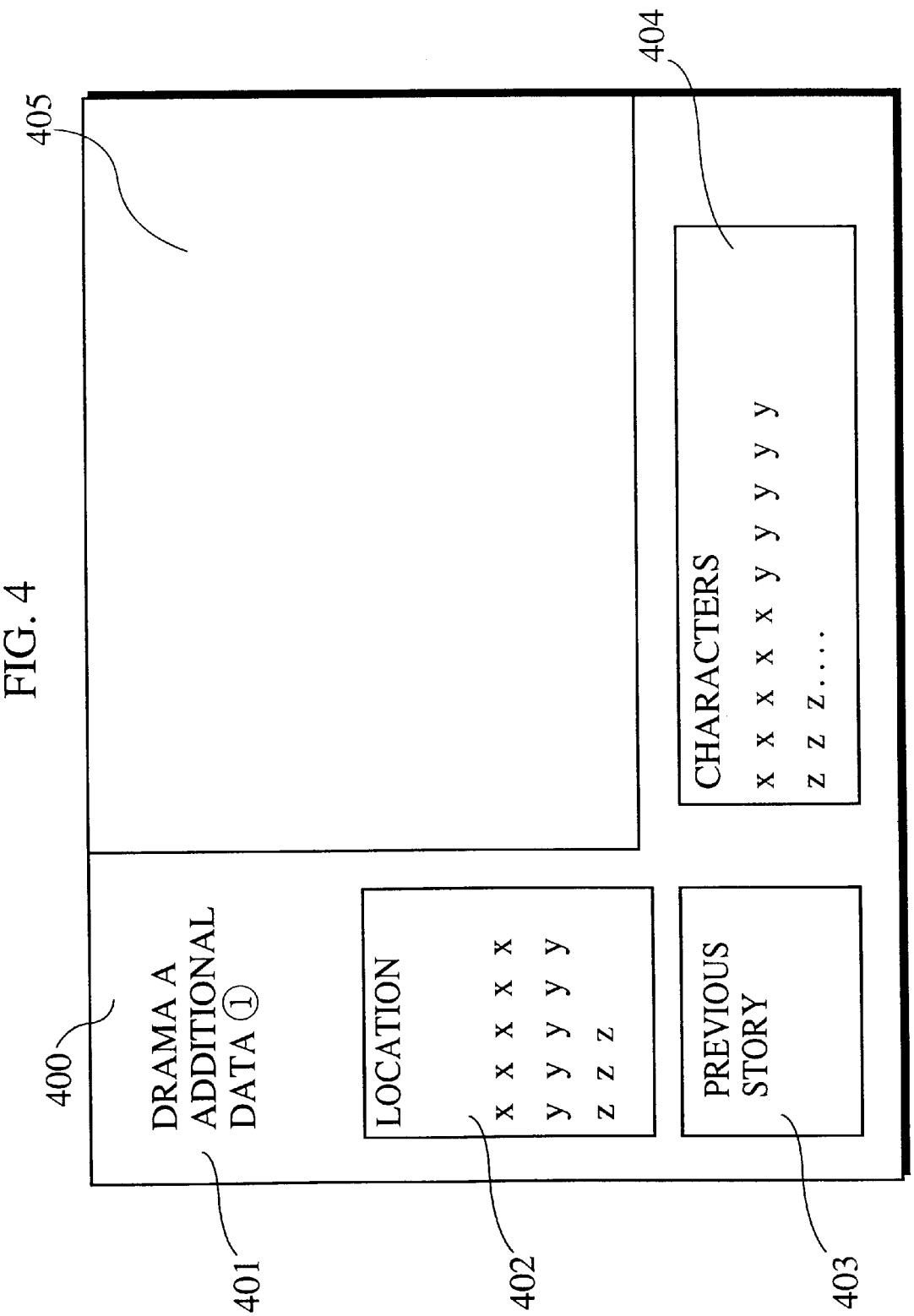
FIG. 4 shows an example display of a data material held in a main data material holding unit shown in FIG. 1.

FIG. 4 shows an example display of a data material held in the main data material holding unit 103.

In the drawing, a display region 400 is used to display drama A additional data ① 401 which is a data material of the main program "drama A". This data material contains detailed information relating to the main program "drama A", such as location information 402 about the location of the drama A, story information 403 about the previous story of the drama A, and character information 404 about the characters in the drama A. A display region 405 is used to display the main program "drama A".

The CM data material holding unit 104 holds data materials for the CM programs.

Figure 5:
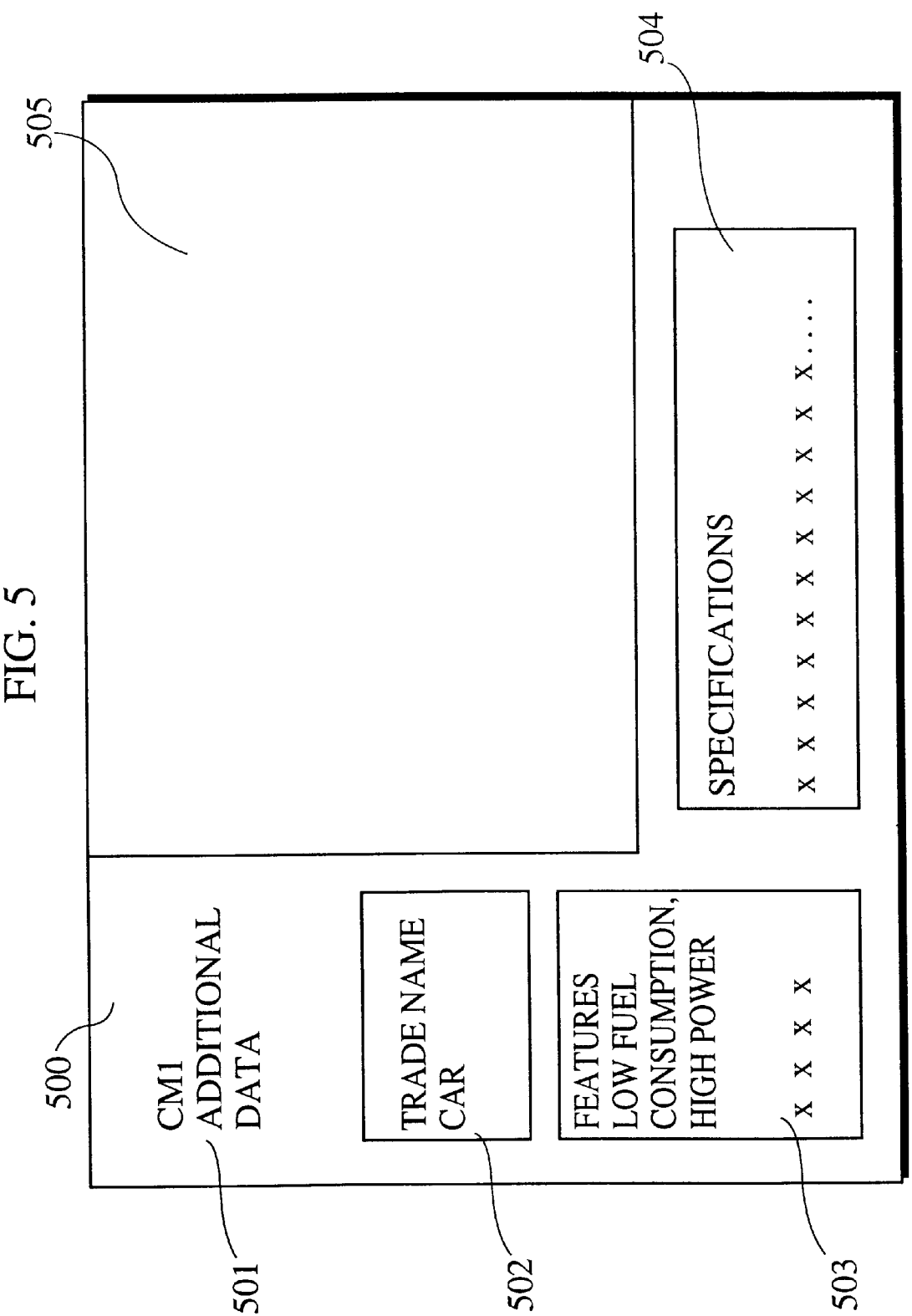
FIGS. 5–7 each show an example display of a data material held in a CM data material holding unit shown in FIG. 1.
Figure 6:
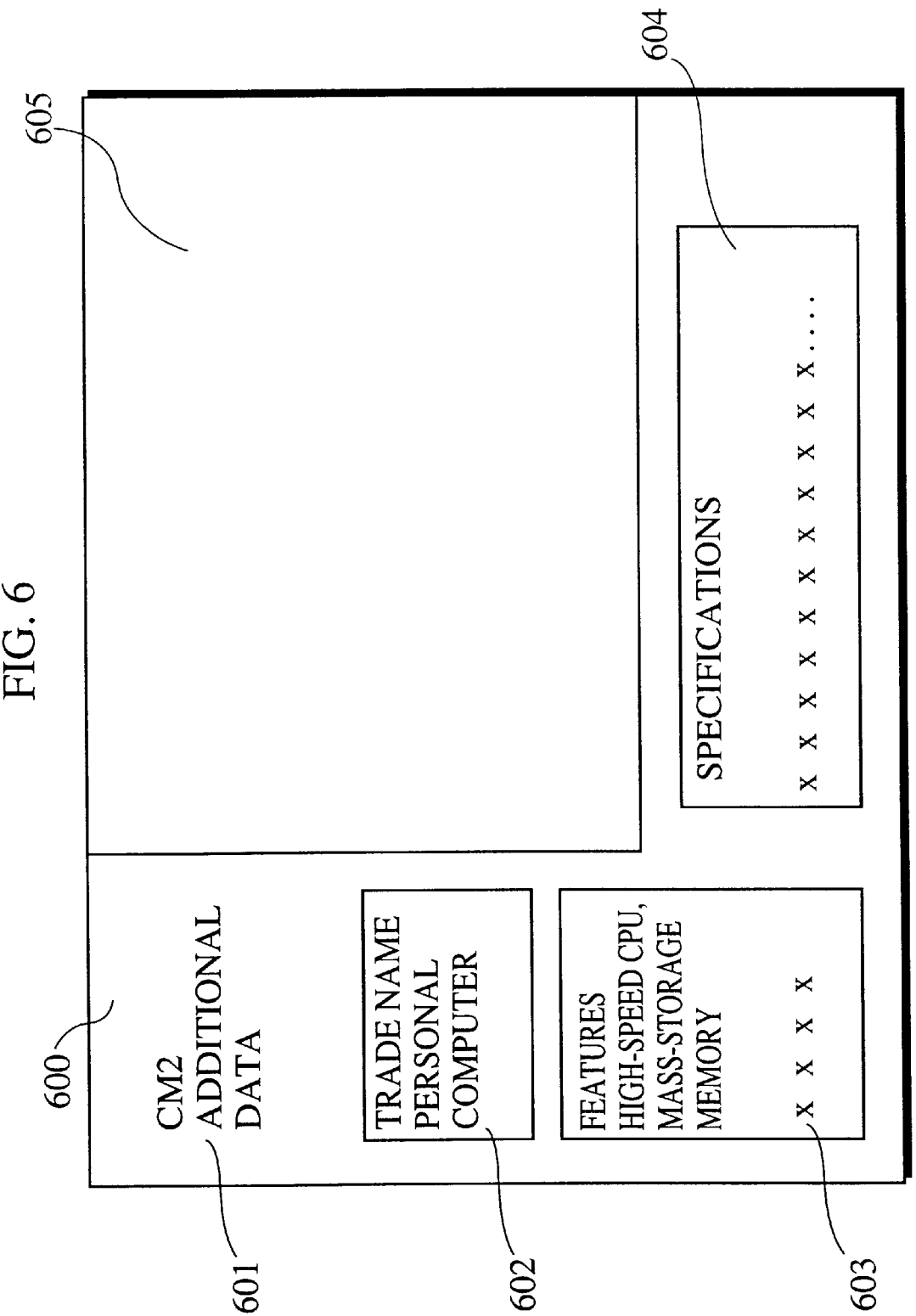
Figure 7:
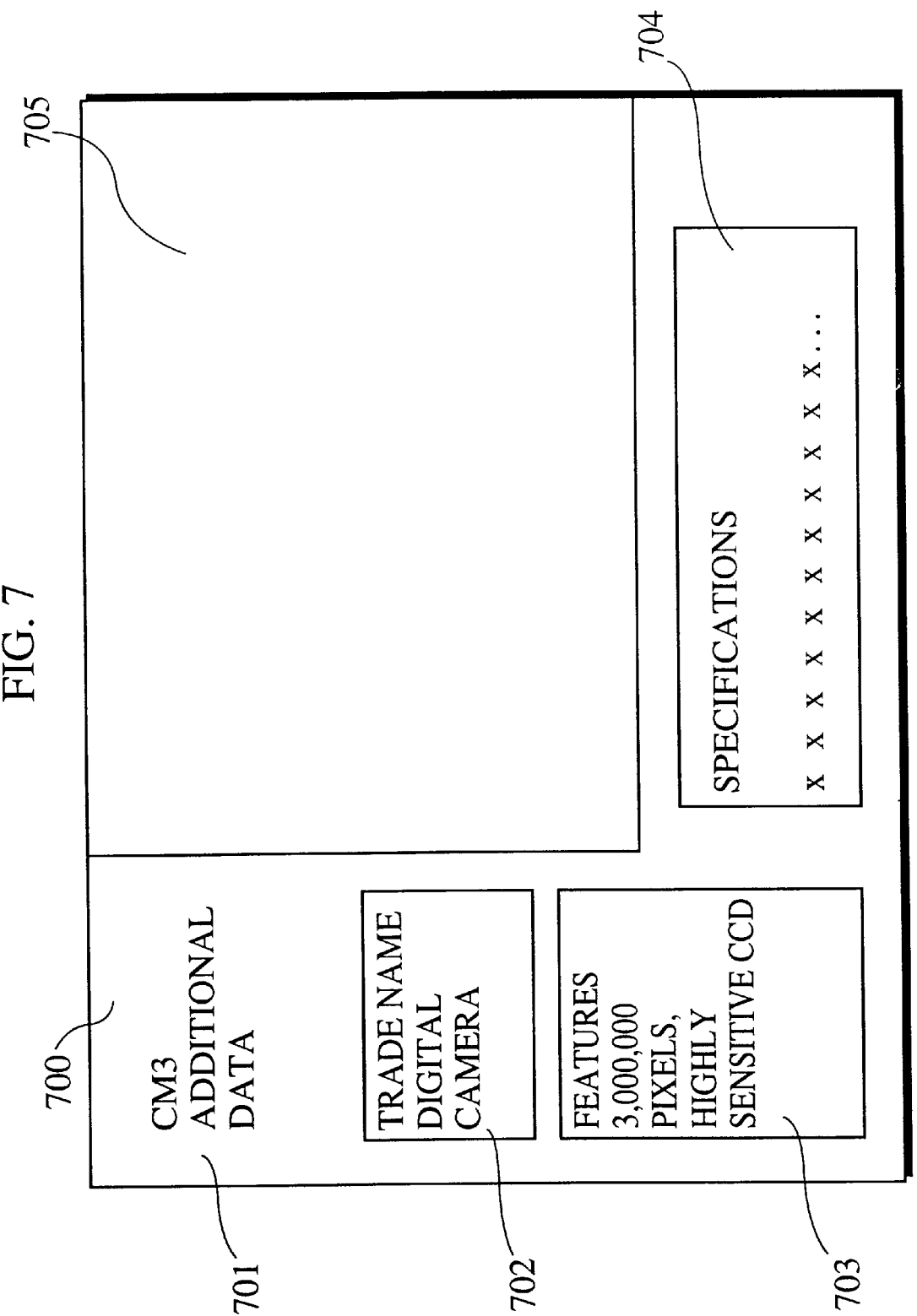

FIGS. 5–7 each show an example display of a data material held in the CM data material holding unit 104.

In FIG. 5, a display region 500 is used to display CM1 additional data 501 which is a data material of the CM program of the car. This data material contains detailed information relating to the car being advertised, such as trade name information 502 about the trade name of the car, feature information 503 about the features of the car, and spec information 504 about the specifications of the car. A display region 505 is used to display the car CM program.

In FIG. 6, a display region 600 is used to display CM2 additional data 601 which is a data material of the CM program of the personal computer. This data material contains detailed information relating to the personal computer being advertised, such as trade name information 602 about the trade name of the personal computer, feature information 603 about the features of the personal computer, and spec information 604 about the specifications of the personal computer. A display region 605 is used to display the personal computer CM program.

In FIG. 7, a display region 700 is used to display CM3 additional data 701 which is a data material of the CM program of the digital camera. This data material contains detailed information relating to the digital camera being advertised, such as trade name information 702 about the trade name of the digital camera, feature information 703 about the features of the digital camera, and spec information 704 about the specifications of the digital camera. A display region 705 is used to display the digital camera CM program.

The organization information managing unit 105 is equipped with a storage medium, such as a memory or a HDD, for storing organization information about the programs to be broadcasted, and an I/O terminal for reading/writing organization information by an organizer.

FIGS. 8 and 9 each show an example of organization information managed by the organization information managing unit 105.

Organization information shown in FIG. 8 is a program scheduling management table 800 for managing a transmission schedule of each main program. In this table 800, a program name 801 shows a name of a main program, a program start time 802 shows a time to start the transmission of the main program, a program end time 803 shows a time to end the transmission of the main program, an AV material 804 shows names of AV materials used in the main program, and a data material 805 shows names of data materials used in the main program.

The example shown in FIG. 8 indicates that the main program "drama A" is to be transmitted from 10:00:00 to 11:00:00, and five AV materials that are the drama A first material, the drama A second material, the CM1 material, the CM2 material, and the CM3 material, and six data materials that are the drama A additional data ①, the drama A additional data ②, the drama A additional data ③, the CM1 additional data, the CM2 additional data, and the CM3 additional data are to be used in the main program.

Organization information shown in FIG. 9 is a material scheduling management table 900 for managing a presentation schedule of each material. In this table 900, a program name 901 shows a name of a main program. A material switch time 902 shows a time to start the presentation of each material used in the main program, with the start time of the main program being set as zero time. An AV material 903 shows a name of an AV material which should be presented from when the corresponding material switch time passes after the main program start time. A data material 904 shows a name of a data material which should be presented from when the corresponding material switch time passes after the main program start time.

The example shown in FIG. 9 indicates that the following pairs of AV and data materials should be presented from the following times: the drama A first material and the drama A additional data ① from the start time of the main program "drama A"; the CM1 material and the CM1 additional data from 14 minutes after the main program start time; the CM2 material and the CM2 additional data from 14 minutes and 15 seconds after the main program start time; the drama A second material and the drama A additional data ① from 14 minutes and 30 seconds after the main program start time; and the CM3 material and the CM3 additional data from 29 minutes and 45 seconds after the main program start time.

The transmission controlling unit 106 contains a clock. With reference to the organization information managed in the organization information managing unit 105, the transmission controlling unit 106 controls the operation of the entire apparatus, by managing operation timings of and issuing instructions to the AV transmitting unit 107, the carousel generating unit 108, the carousel transmitting unit 109, and the event message transmitting unit 110.

More specifically, with reference to the program scheduling management table 800, the transmission controlling unit 106 outputs the names of all data materials which are used in the main program, to the carousel generating unit 108 a predetermined time period (e.g. 1 minute) before the main program start time.

The carousel generating unit 108 reads the data materials specified by the names given from the transmission controlling unit 106, from the main data material holding unit 103 and the CM data material holding unit 104. The carousel generating unit 108 then generates carousel data from the read data materials. Carousel data referred to here is data of one cycle which is repeatedly transmitted using the carousel method.

Figure 10:
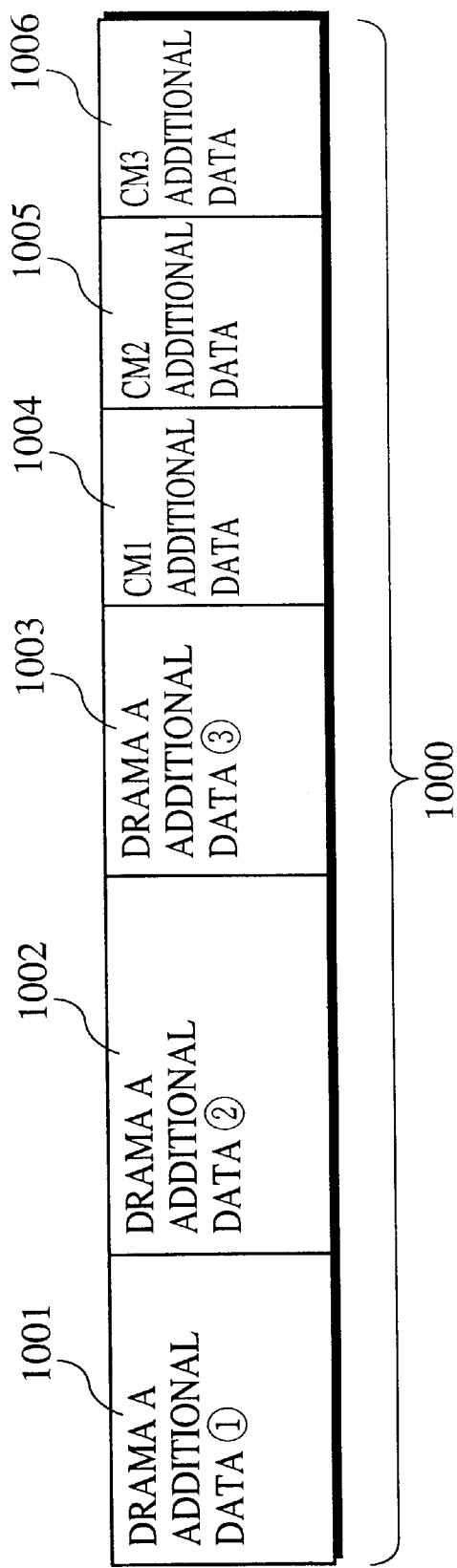
FIG. 10 shows an example of carousel data generated by a carousel generating unit shown in FIG. 1.

FIG. 10 shows an example of carousel data generated by the carousel generating unit 108. The carousel data 1000 is assembled in a predetermined order and includes the additional data corresponding to the main AV material and commercial AV material.

The drawing shows carousel data 1000 which includes drama A additional data ① 1001, drama A additional data ② 1002, drama A additional data ③ 1003, CM1 additional data 1004, CM2 additional data 1005, and CM3 additional data 1006.

Also, with reference to the program scheduling management table 800, the transmission controlling unit 106 instructs the carousel transmitting unit 109 to start the transmission of the carousel data at the main program start time, and to stop the transmission at the main program end time.

The carousel transmitting unit 109 accordingly outputs the carousel data to the multiplexing unit 111 repeatedly.

Also, the transmission controlling unit 106 refers to the material scheduling management table 900. When any material switch time passes after the main program start time, the transmission controlling unit 106 outputs a name of a data material corresponding to the material switch time to the event message transmitting unit 110, and instructs the event message transmitting unit 110 to transmit an event message.

The event message transmitting unit 110 accordingly generates the event message which indicates to present the data material specified by the name given from the transmission controlling unit 106, and outputs the event message to the multiplexing unit 111.

An event message is a small amount of message information that is used by the broadcast apparatus 100 to instruct application software operating in the reception apparatus 112 to execute a particular event at once or at a specified time.

Here, the correspondence between message IDs and events is defined in the application software in the reception apparatus 112 beforehand, so that the reception apparatus 112 executes an event such as switching from one data material to another, based on a message ID included in a received event message.

A message ID is an identifier of an event message generated by the event message transmitting unit 110.

Also, defining an event can be done by writing the contents of event using a script language. The details on event messages and script language descriptions are shown in the ARIB STD-B24 specification "Data Broadcast Coding and Transmission in Digital Broadcasting".

FIG. 11 shows an example of a correspondence table between data material names and message IDs.

In a data material —message ID correspondence table 1100 in FIG. 11, a data material name 1101 is used as an index when the event message transmitting unit 110 retrieves a message ID based on a data material name received from the transmission controlling unit 106, whereas a message ID 1102 shows the message ID corresponding to the data material name.

In FIG. 11, a data material name "drama A additional data ①" corresponds to a message ID "100", a data material name "CM1 additional data" corresponds to a message ID "101", a data material name "CM2 additional data" corresponds to a message ID "102", and a data material name "CM3 additional data" corresponds to a message ID "103".

Also, with reference to the program scheduling management table 800 and the material scheduling management table 900, the transmission controlling unit 106 outputs a name of an AV material which should be presented first in the main program to the AV transmitting unit 107, and instructs the AV transmitting unit 107 to start transmitting the AV material, at the main program start time. Whenever a material switch time passes after the main program start time, the transmission controlling unit 106 outputs a name of an AV material corresponding to the material switch time to the AV transmitting unit 107, and instructs the AV transmitting unit 107 to switch the transmission to the AV material. Finally, at the main program end time the transmission controlling unit 106 instructs the AV transmitting unit 107 to stop the transmission.

The AV transmitting unit 107 accordingly reads an AV material specified by a name given from the transmission controlling unit 106, from the main AV material holding unit 101 or the CM AV material holding unit 102. The AV transmitting unit 107 outputs the read AV material to the multiplexing unit 111.

The multiplexing unit 111 multiplexes the AV material given from the AV transmitting unit 107, the carousel data given from the carousel transmitting unit 109, and the event message given from the event message transmitting unit 110, to generate a data stream. The multiplexing unit 111 then broadcasts the data stream to the reception apparatus 112.

The multiplexing unit 111 can be implemented by a transport stream multiplexing device used in general digital satellite broadcasting, or software having the same functions as the multiplexing device.

The reception apparatus 112 receives the data stream broadcasted by the broadcast apparatus 100, and displays a program of the AV material multiplexed in the data stream on the TV 113. The reception apparatus 112 also displays detailed information on the program based on the data materials in the carousel data multiplexed in the data stream, while switching the display in accordance with the event message multiplexed in the data stream.

(Operation)

The following is an explanation on a broadcast operation of the broadcast apparatus 100 in the first embodiment.

Figure 12:
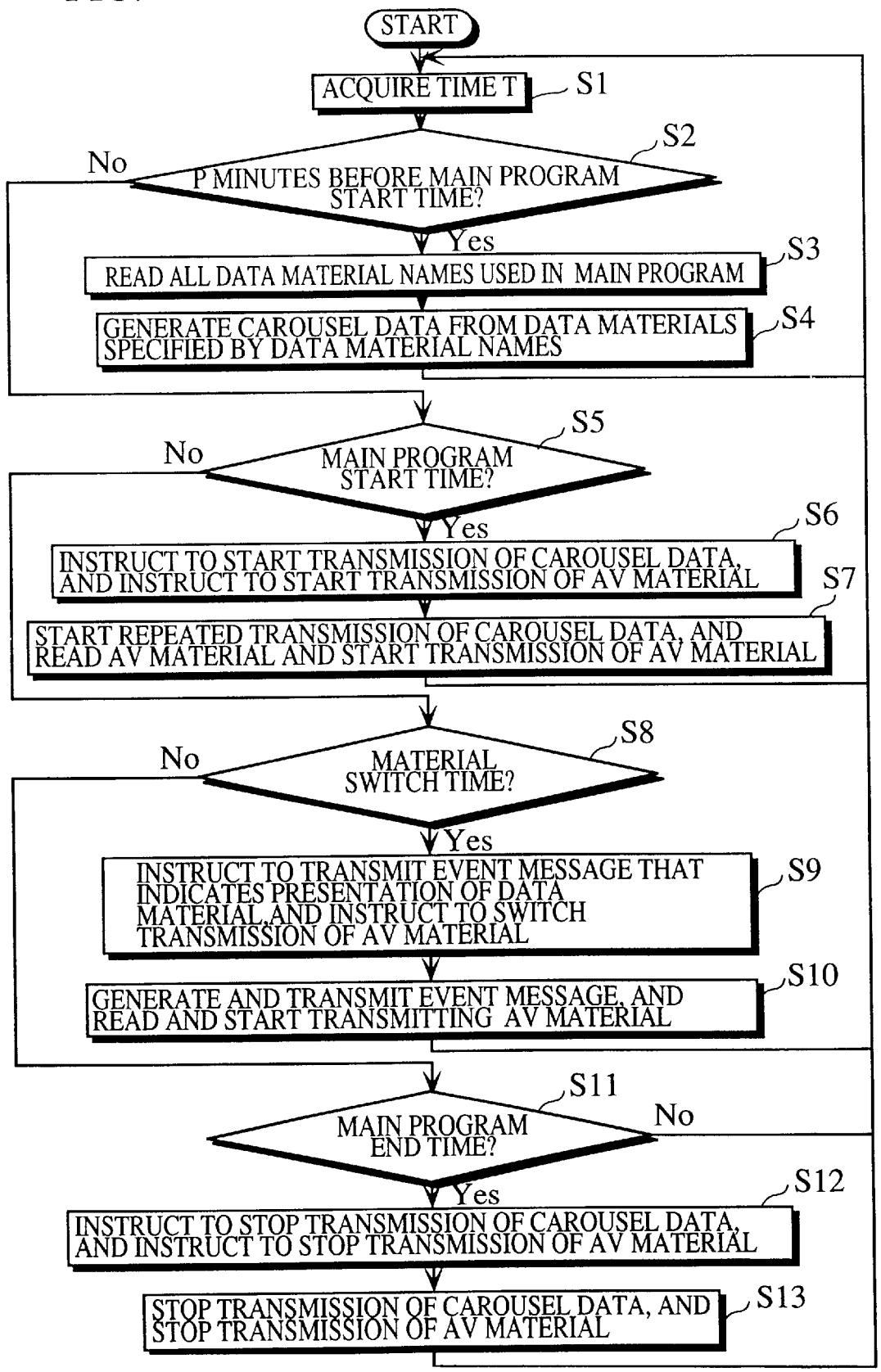
FIG. 12 is a flowchart of a transmission operation of a broadcast apparatus in the first embodiment.

FIG. 12 is a flowchart showing a transmission operation of the broadcast apparatus 100.

(1) The transmission controlling unit 106 acquires a time T from the internal clock (S1).

(2) The transmission controlling unit 106 judges whether the time T is P minutes before the main program start time shown in the program scheduling management table 800 managed in the organization information managing unit 105 (S2). Here, P minutes are a predetermined time period which is set at no shorter than the minimum time period required to generate carousel data.

(3) On judging that the time T is P minutes before the main program start time, the transmission controlling unit 106 reads all data material names used in the main program from the program scheduling management table 800, and passes them to the carousel generating unit 108 (S3).

(4) The carousel generating unit 108 reads data materials specified by the data material names passed from the transmission controlling unit 106, from the main data material holding unit 103 and the CM data material holding unit 104. The carousel generating unit 108 generates carousel data from these data materials (S4).

(5) The transmission controlling unit 106 judges whether the time T is the main program start time shown in the program scheduling management table 800 (S5).

(6) On judging that the time T is the main program start time, the transmission controlling unit 106 instructs the carousel transmitting unit 109 to start transmitting the carousel data generated by the carousel generating unit 108. The transmission controlling unit 106 also passes a name of an AV material corresponding to the zero material switch time to the AV transmitting unit 107, and instructs the AV transmitting unit 107 to start transmitting the AV material (S6).

(7) The carousel transmitting unit 109 starts repeatedly transmitting the carousel data, in accordance with the instruction by the transmission controlling unit 106. Also, the AV transmitting unit 107 reads the AV material specified by the name passed from the transmission controlling unit 106, from the main AV material holding unit 101 or the CM AV material holding unit 102, and starts transmitting the AV material (S7).

(8) The transmission controlling unit 106 judges whether the time T is when any material switch time except the zero material switch time passes from the main program start time (S8).

(9) On judging that the time T is a material switch time after the main program start time, the transmission controlling unit 106 passes a data material name corresponding to the material switch time to the event message transmitting unit 110, and instructs the event message transmitting unit 110 to transmit an event message which indicates to present a data material specified by the data material name. The transmission controlling unit 106 also passes an AV material name corresponding to the material switch time to the AV transmitting unit 107, and instructs the AV transmitting unit 107 to switch the transmission to an AV material specified by the AV material name (S9).

(10) The event message transmitting unit 110 refers to the data material—message ID correspondence table 1100, generates an event message including a message ID corresponding to the data material name passed from the transmission controlling unit 106, and transmits the event message. Also, the AV transmitting unit 107 reads an AV material specified by the AV material name passed from the transmission controlling unit 106, from the main AV material holding unit 101 or the CM AV material holding unit 102, and starts transmitting the read AV material (S10).

(11) The transmission controlling unit 106 judges whether the time T is the main program end time shown in the program scheduling management table 800 (S11).

(12) On judging that the time T is the main program end time, the transmission controlling unit 106 instructs the carousel transmitting unit 109 to stop transmitting the carousel data, and the AV transmitting unit 107 to stop transmitting the AV material (S12).

(13) The carousel transmitting unit 109 accordingly stops transmitting the carousel data. Also, the AV transmitting unit 107 accordingly stops transmitting the AV material (S13).

Figure 13:
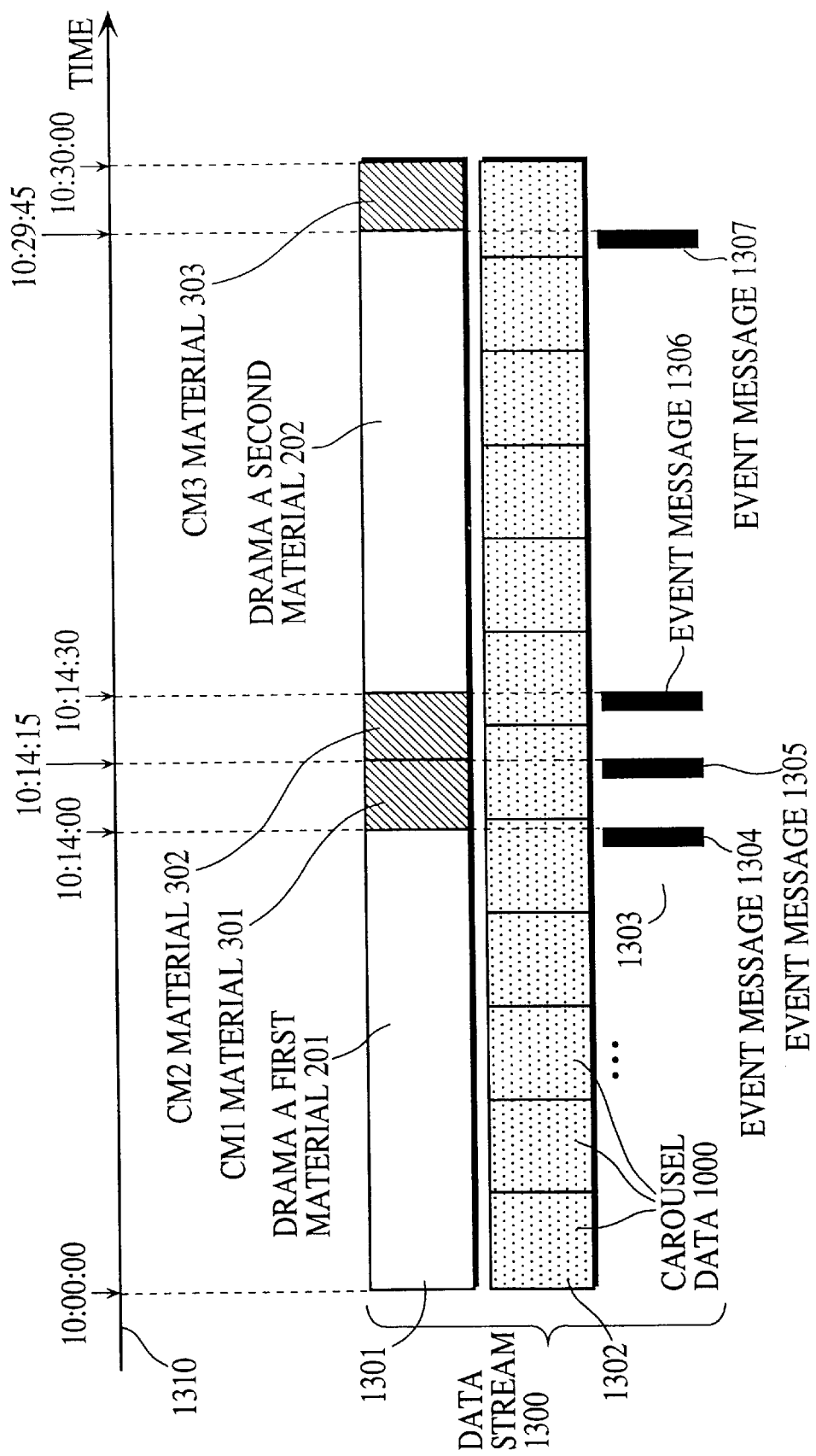
FIG. 13 shows an example of a data stream outputted from the broadcast apparatus.

FIG. 13 shows an example of a data stream outputted from the broadcast apparatus 100.

Here, it is assumed that: the drama A first material 201 and the drama A second material 202 are held in the main AV material holding unit 101; the CM1 material 301, the CM2 material 302, and the CM3 material 303 are held in the CM AV material holding unit 102; the drama A additional data ① 401 is held in the main data material holding unit 103; the CM1 additional data 501, the CM2 additional data 601, and the CM3 additional data 701 are held in the CM data material holding unit 104; and the program scheduling management table 800 and the material scheduling management table 900 are held in the organization information managing unit 105.

In a data stream 1300 shown in FIG. 13, the upper part shows a program data stream 1301, the middle part shows a carousel data portion 1302 of an additional data stream, and the lower part shows an event message portion 1303 of the additional data stream.

In the drawing, an arrow 1310 represents a time axis, showing the passage of time from left to right. Values given above the arrow 1310 represent time.

In the program data stream 1301, the transmission of the drama A first material 201 starts from 10:00:00, which is switched to the CM1 material 301 at 10:14:00, to the CM2 material 302 at 10:14:15, to the drama A second material 202 at 10:14:30, and to the CM3 material 303 at 10:29:45. The transmission ends at 10:30:00.

In the carousel data portion 1302, the transmission of the carousel data 1000 starts from 10:00:00, which is repeated until 10:30:00.

Also, every time one AV material is switched to another in the program data stream 1301, an event message indicating to switch from one data material to another is transmitted. In the example in FIG. 13, an event message 1304 is transmitted at 10:14:00, an event message 1305 at 10:14:15, an event message 1306 at 10:14:30, and an event message 1307 at 10:29:45.

Figure 14:
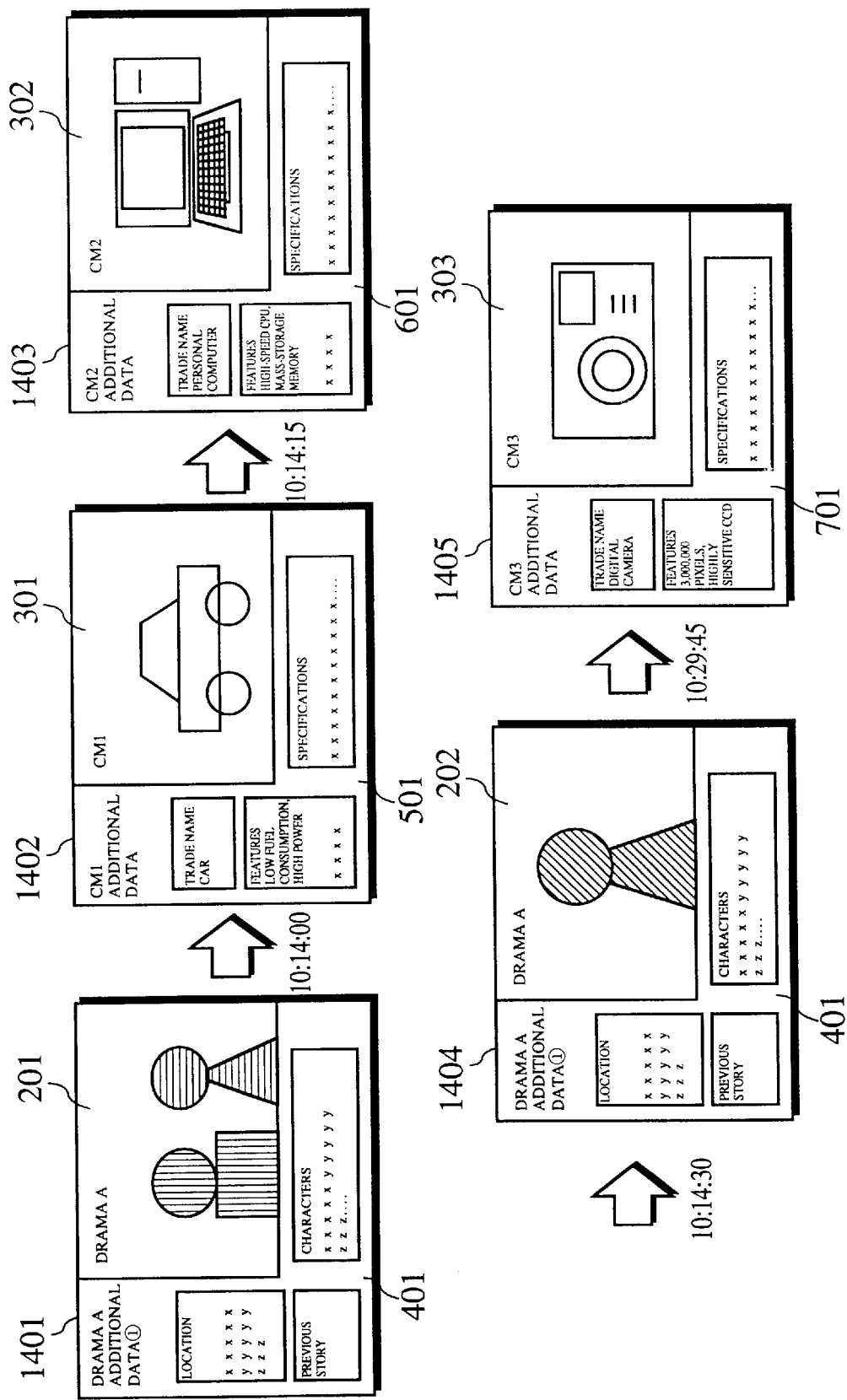
FIG. 14 shows an example of displays which are sequentially displayed on a TV when a reception apparatus receives the data stream shown in FIG. 13.

FIG. 14 shows an example of a transition of displays on the TV 113 when the reception apparatus 112 receives the data stream 1300 shown in FIG. 13.

An operation of the reception apparatus 112 when the data stream 1300 is received is explained below, with reference to FIG. 14.

(1) In a display 1401, the reception apparatus 112 starts receiving the data stream 1300 at the main program start time of 10:00:00, displays the drama A first material 201 contained in the program data stream 1301 in the top right display region on the TV 113, and displays the drama A additional data ① 401 contained in the carousel data 1000 in the carousel data portion 1302, in the bottom left L-shaped display region on the TV 113.

Here, it is specified by the broadcast apparatus 100 in advance that the reception apparatus 112 displays the drama A additional data ① 401 first.

To specify which data material is to be displayed first in the reception apparatus 112, a method may be used whereby an identifier of a data material displayed by default is fixed in the reception apparatus 112, and this identifier is added to a data material which should be displayed first in the broadcast apparatus 100. Alternatively, the broadcast apparatus 100 may transmit an identifier of a data material which should be displayed first, to the reception apparatus 112 as control information. These methods are described in detail in the ARIB STD-B24 specification "Data Broadcast Coding and Transmission in Digital Broadcasting".

(2) The reception apparatus 112 receives the CM1 additional data 501 which should be presented next, and stores it in a memory, in preparation for the next switching of presentation.

Here, to determine which data material the reception apparatus 112 should receive, a method whereby the broadcast apparatus 100 transmits the data materials with their priorities specified, or a method whereby the broadcast apparatus 100 writes the priorities in the data materials using a script language beforehand, may be used. These methods are described in detail in the ARIB STD-B24 specification "Data Broadcast Coding and Transmission in Digital Broadcasting".

Alternatively, the reception apparatus 112 may receive and store all data materials contained in the carousel data 1000, i.e. the drama A additional data ① 401, the CM1 additional data 501, the CM2 additional data 601, and the CM3 additional data 701, beforehand.

(3) In a display 1402, the reception apparatus 112 displays the CM1 material 301 contained in the program data stream 1301 in the top right display region on the TV 113 at 10:14:00, and at the same time receives the event message 1304 and displays the CM1 additional data 501 corresponding to the message ID "101" included in the event message 1304, in the bottom left L-shaped display region on the TV 113.

Here, since the reception apparatus 112 stores the CM1 additional data 501 beforehand, the CM1 additional data 501 can be displayed without delay.

(4) The reception apparatus 112 receives the CM2 additional data 601 which should be presented next, and stores it into the memory, in preparation for the next switching of presentation.

(5) In a display 1403, the reception apparatus 112 displays the CM2 material 302 contained in the program data stream 1301 in the top right display region on the TV 113 at 10:14:15, and at the same time receives the event message 1305 and displays the CM2 additional data 601 corresponding to the message ID "102" included in the event message 1305, in the bottom left L-shaped display region on the TV 113.

(6) The reception apparatus 112 receives the drama A additional data ① 401 which should be presented next, and stores it into the memory, in preparation for the next switching of presentation.

(7) In a display 1404, the reception apparatus 112 displays the drama A second material 202 contained in the program data stream 1301 in the top right display region on the TV 113 at 10:14:30, and at the same time receives the event message 1306 and displays the drama A additional data ① 401 corresponding to the message ID "100" included in the event message 1306, in the bottom left L-shaped display region on the TV 113.

(8) The reception apparatus 112 receives the CM3 additional data 701 which should be presented next, and stores it into the memory, in preparation for the next switching of presentation.

(9) In a display 1405, the reception apparatus 112 displays the CM3 material 303 contained in the program data stream 1301 in the top right display region on the TV 113 at 10:29:45, and at the same time receives the event message 1307 and displays the CM3 additional data 701 corresponding to the message ID "103" included in the event message 1307, in the bottom left L-shaped display region on the TV 113.

According to this embodiment, the broadcast apparatus generates carousel data including data materials which should be added respectively to AV materials to be presented in sequence in a main program, and repeatedly broadcasts the carousel data from the broadcast start time of the main program. The broadcast apparatus also broadcasts, every time one AV material is switched to another, an event message which indicates to present a data material corresponding to the latter AV material. The reception apparatus receives the data material corresponding to the latter AV material from the carousel data and stores it in a memory, before the AV materials are switched. Accordingly, on receiving the event message, the reception apparatus can present the stored data material together with the latter AV material to the viewer without delay.

Here, an event message which indicates to present a data material can be contained within one transport packet (188 bytes). Therefore, when a transmission band of 500 Kbps is used, time taken for the reception apparatus to acquire the event message is 0.003008 seconds or below. Hence there is almost no delay in presenting the data material.

Accordingly, it is possible to precisely synchronize the timing of switching AV materials and the timing of switching data materials.

Second Embodiment (Overview)

The second embodiment of the present invention is the same as the first embodiment in that a broadcast apparatus repeatedly broadcasts main program additional data which should be presented to the viewer with a main program and CM program additional data which should be presented to the viewer with a CM program inserted in the main program, beginning at the broadcast start time of the main program. The broadcast apparatus also broadcasts an indication to switch from the main program additional data to the CM program additional data, at the broadcast start time of the CM program. However, the second embodiment differs with the first embodiment in that the broadcast apparatus further broadcasts an identifier of the CM program additional data using an event message a certain time period before the broadcast start time of the CM program, thereby instructing the reception apparatus to receive the CM program additional data specified by the identifier and store it in a memory before the broadcast of the CM program starts.

(Construction)

Figure 15:
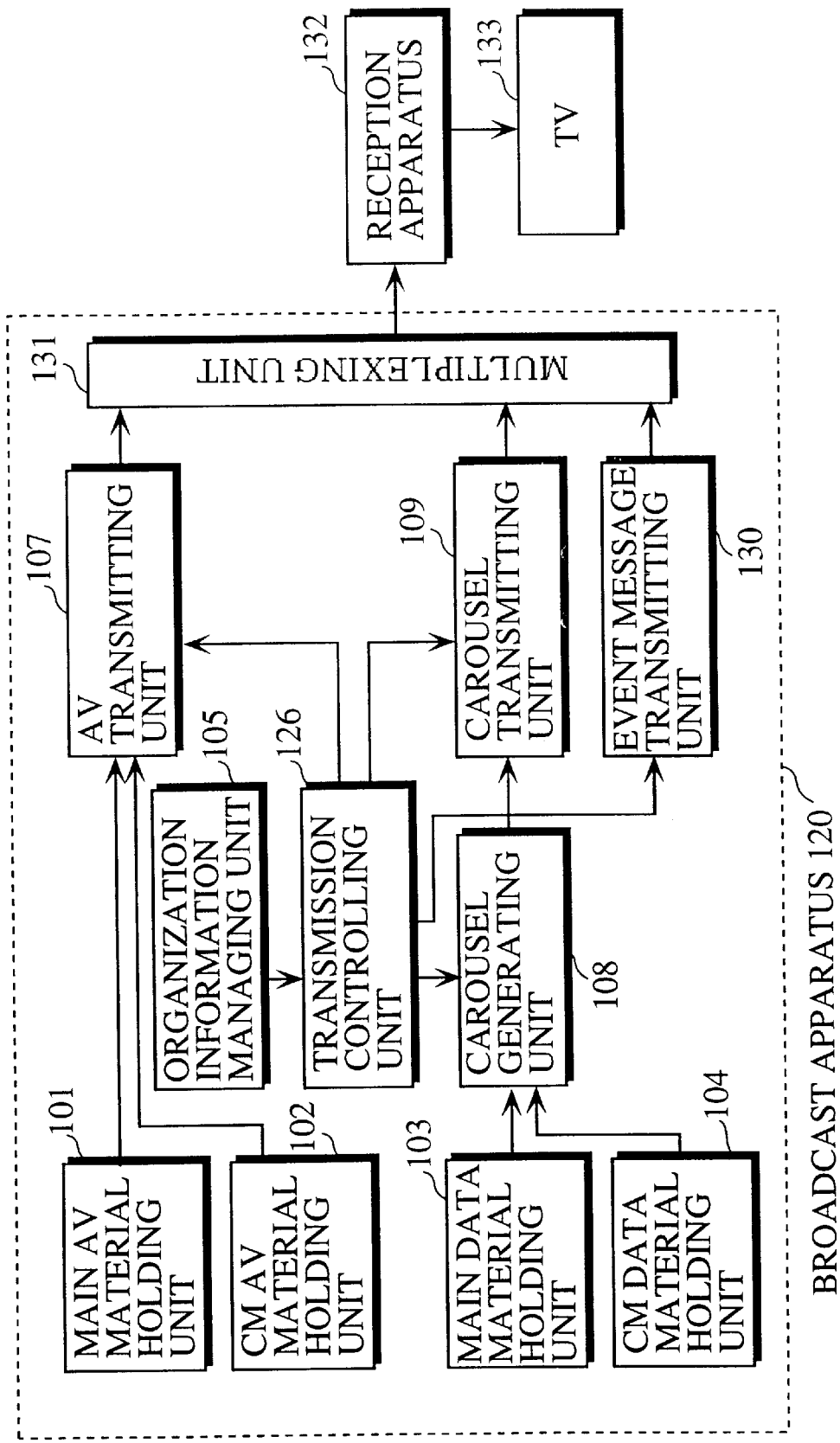
FIG. 15 is a block diagram showing a construction of a broadcast system to which the second embodiment of the invention relates.

FIG. 15 is a block diagram of a construction of a broadcast system to which the second embodiment of the invention relates.

This broadcast system is roughly made up of a broadcast apparatus 120 and a reception apparatus 132.

The drawing also shows a TV 133 for presenting programs and data to the viewer based on a data broadcast received by the reception apparatus 132.

Note here that construction elements which are the same as those in the first embodiment shown in FIG. 1 have been given the same reference numerals and their explanation has been omitted.

The broadcast apparatus 120 includes the main AV material holding unit 101, the CM AV material holding unit 102, the main data material holding unit 103, the CM data material holding unit 104, the organization information managing unit 105, a transmission controlling unit 126, the AV transmitting unit 107, the carousel generating unit 108, the carousel transmitting unit 109, an event message transmitting unit 130, and a multiplexing unit 131.

The transmission controlling unit 126 operates in the same way as the transmission controlling unit 106 in the first embodiment. In addition, with reference to the material scheduling management table 900, the transmission controlling unit 126 passes, a predetermined time period (e.g. 1 minute) before each material switch time except the zero material switch time, a name of a data material corresponding to the material switch time to the event message transmitting unit 130. The transmission controlling unit 126 also instructs the event message transmitting unit 130 to transmit an event message that indicates to store the data material into the memory. Furthermore, after the material switch time, the transmission controlling unit 126 instructs the event message transmitting unit 130 to transmit an event message that indicates to set the data material whose presentation has ended deletable from the memory.

The event message transmitting unit 130 accordingly generates the event message which indicates to present the data material specified by the name passed from the transmission controlling unit 126, the event message which indicates to store into the memory the data material specified by the name passed from the transmission controlling unit 126, and the event message which indicates to set the data material whose presentation has ended deletable. The event message transmitting unit 130 passes these event messages to the multiplexing unit 131.

The multiplexing unit 131 multiplexes the AV material given from the AV transmitting unit 107, the carousel data given from the carousel transmitting unit 109, and the event messages given from the event message transmitting unit 130, to generate a data stream. The multiplexing unit 131 then broadcasts the data stream to the reception apparatus 132.

The reception apparatus 132 receives the data stream broadcasted by the broadcast apparatus 120, and displays a program of the AV material multiplexed in the data stream on the TV 133. The reception apparatus 132 also displays detailed information on the program based on the data materials in the carousel data multiplexed in the data stream, while storing, switching, and deleting such information in accordance with the event messages multiplexed in the data stream.

(Operation)

The following is an explanation on a broadcast operation of the broadcast apparatus 120 in the second embodiment.

Figure 16:
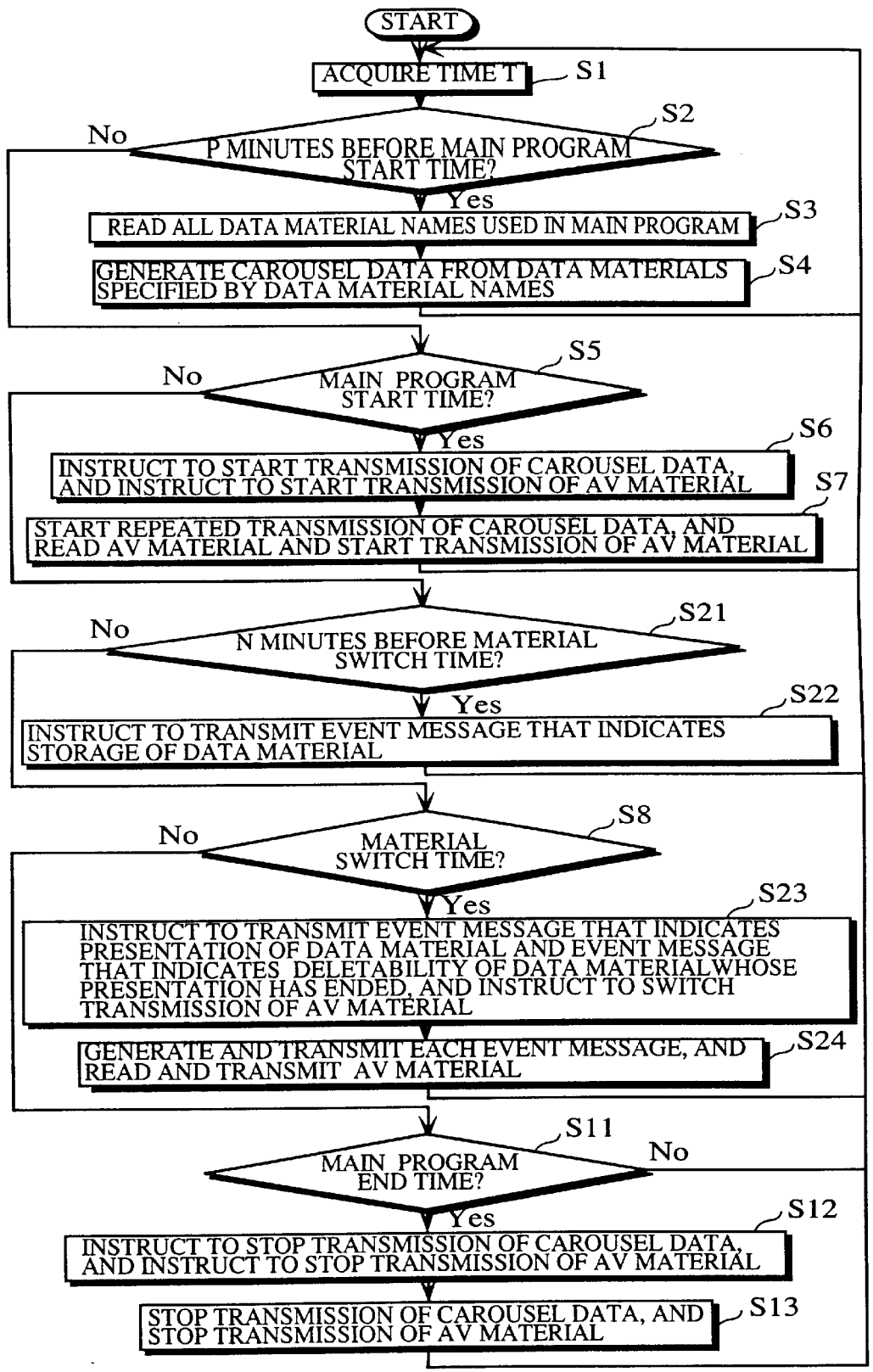
FIG. 16 is a flowchart of a transmission operation of a broadcast apparatus in the second embodiment;.

FIG. 16 is a flowchart showing a transmission operation of the broadcast apparatus 120.

When compared with FIG. 12, steps S21 and S22 have been newly included and steps S9 and S10 have been replaced with steps S23 and S24, in FIG. 16.

Steps which are the same as those in FIG. 12 have been given the same reference numerals and their explanation has been omitted.

(1)–(7) Same as (1)–(7) in the first embodiment (S1–S7), except that the transmission controlling unit 126 replaces the transmission controlling unit 106.

(8) The transmission controlling unit 126 judges whether the time T is N minutes before a material switch time (S21). N minutes are a predetermined time period that is preferably no shorter than the minimum time period required for the reception apparatus 132 to receive and store a data material.

(9) On judging that the time T is N minutes before the material switch time, the transmission controlling unit 126 passes a name of a data material corresponding to the material switch time to the event message transmitting unit 130, and instructs the event message transmitting unit 130 to transmit an event message which indicates to store the data material into the memory (S22).

(10) Same as (8) in the first embodiment (S8), except that the transmission controlling unit 126 replaces the transmission controlling unit 106.

(11) On judging that the time T is the material switch time, the transmission controlling unit 126 passes the name of the data material corresponding to the material switch time to the event message transmitting unit 130, and instructs the event message transmitting unit 130 to transmit an event message which indicates to present the data material and an event message which indicates to set a data material whose presentation has ended deletable. The transmission controlling unit 126 also passes a name of an AV material corresponding to the material switch time to the AV transmitting unit 107, and instructs the AV transmitting unit 107 to switch the transmission to the AV material (S23).

(12) With reference to the data material—message ID correspondence table 1100, the event message transmitting unit 130 generates the event message which includes a message ID corresponding to the data material name passed from the transmission controlling unit 126 and which indicates to present the data material specified by the name, and the event message which indicates to set the data material whose presentation has ended deletable. The event message transmitting unit 130 transmits these event messages.

Also, the AV transmitting unit 107 reads the AV material specified by the AV material name passed from the transmission controlling unit 126, from the main AV material holding unit 101 or the CM AV material holding unit 102. The AV transmitting unit 107 starts transmitting the read AV material (S24). (13)–(15) Same as (11)–(13) in the first embodiment (S11–S13), except that the transmission controlling unit 126 replaces the transmission controlling unit 106.

Figure 17:
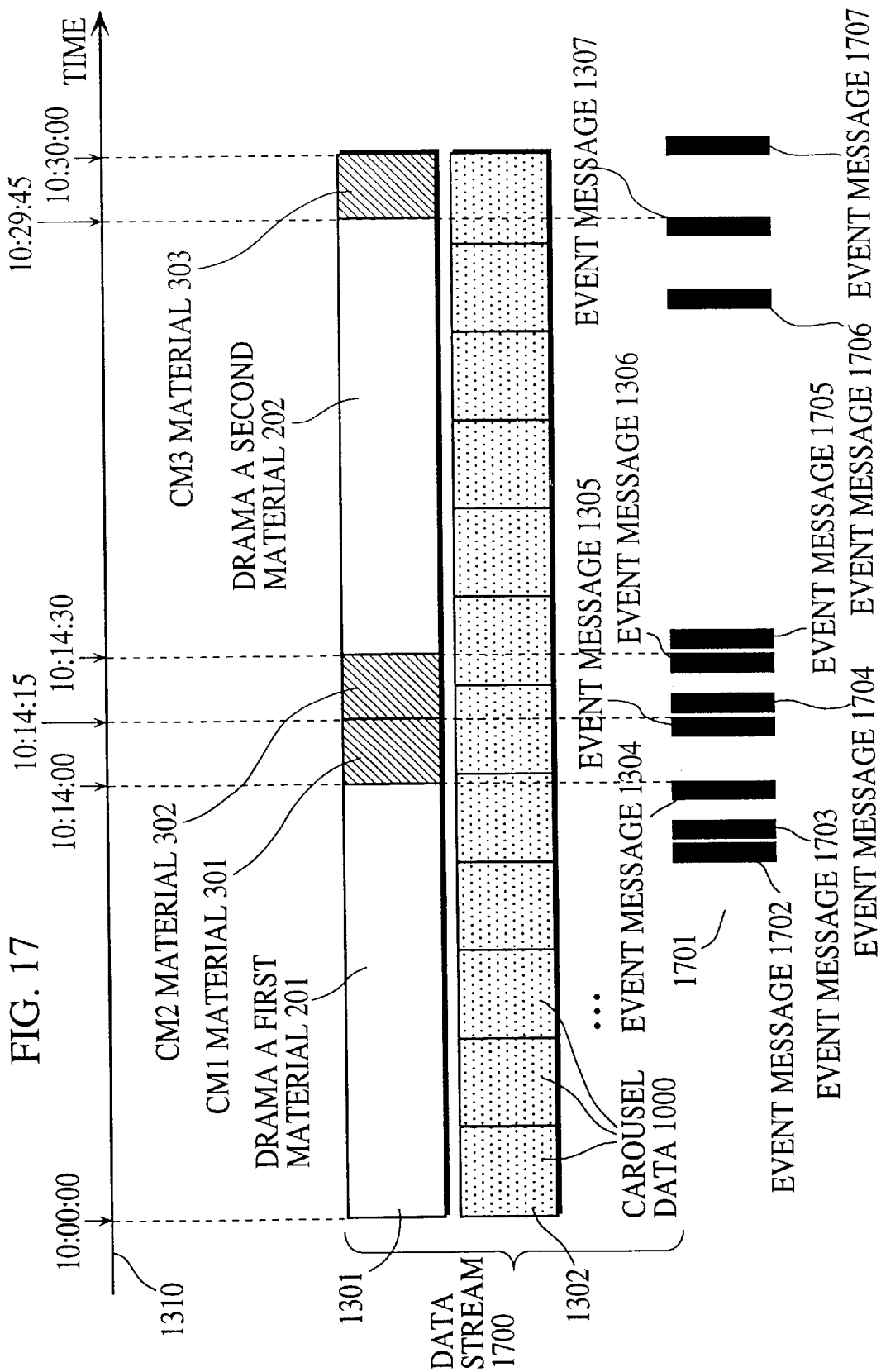
FIG. 17 shows an example of a data stream outputted from the broadcast apparatus.

FIG. 17 shows an example of a data stream outputted from the broadcast apparatus 120.

Same as the example shown in FIG. 13 in the first embodiment, it is assumed that: the drama A first material 201 and the drama A second material 202 are held in the main AV material holding unit 101; the CM1 material 301, the CM2 material 302, and the CM3 material 303 are held in the CM AV material holding unit 102; the drama A additional data ① 401 is held in the main data material holding unit 103; the CM1 additional data 501, the CM2 additional data 601, and the CM3 additional data 701 are held in the CM data material holding unit 104; and the program scheduling management table 800 and the material scheduling management table 900 are held in the organization information managing unit 105.

In a data stream 1700 in FIG. 17, the upper part shows the program data stream 1301, the middle part shows the carousel data portion 1302 of the additional data stream, and the lower part shows an event message portion 1701 of the additional data stream.

Here, elements which are the same as those in the first embodiment shown in FIG. 13 have been given the same reference numerals and their explanation has been omitted.

The data stream 1700 in FIG. 17 differs with the data stream 1300 in FIG. 13 only in the event message portion 1701 which newly includes event messages 1702, 1703, and 1706 each for indicating to store a data material and event messages 1704, 1705, and 1707 each for indicating to set a data material deletable.

The event message 1702 is transmitted N minutes before the event message 1304 which indicates the presentation of the CM1 additional data 501, to indicate to store the CM1 additional data 501.

The event message 1703 is transmitted N minutes before the event message 1305 which indicates the presentation of the CM2 additional data 601, to indicate to store the CM2 additional data 601.

The event message 1704 is transmitted after the event message 1305 which indicates the presentation of the CM2 additional data 601, to indicate to set deletable the CM1 additional data 501 whose presentation has ended.

The event message 1705 is transmitted after the event message 1306 which indicates the presentation of the drama A additional data ① 401, to indicate to set deletable the CM2 additional data 601 whose presentation has ended.

The event message 1706 is transmitted N minutes before the event message 1307 which indicates the presentation of the CM3 additional data 701, to indicate to store the CM3 additional data 701.

The event message 1707 is transmitted after the main program end time, to indicate to set deletable the CM3 additional data 701 whose presentation has ended.

A transition of displays on the TV 133 when the reception apparatus 132 receives the data stream 1700 shown in FIG. 17 is the same as the one shown in FIG. 14.

An operation of the reception apparatus 132 when the data stream 1700 is received is explained below, with reference to FIG. 14.

(1) In the display 1401, the reception apparatus 132 starts receiving the data stream 1700 at the main program start time of 10:00:00, displays the drama A first material 201 contained in the program data stream 1301 in the top right display region on the TV 133, and displays the drama A additional data ① 401 contained in the carousel data 1000 in the carousel data portion 1302, in the bottom left L-shaped display region on the TV 113.

Here, it is specified by the broadcast apparatus 120 in advance that the reception apparatus 132 displays the drama A additional data ① 401 first.

(2) The reception apparatus 132 receives the event message 1702 N minutes before 10:14:00 (e.g. 10:13:00), and stores the CM1 additional data 501 corresponding to the message ID "101" included in the event message 1702, into the memory.

(3) The reception apparatus 132 receives the event message 1703 N minutes before 10:14:15 (e.g. 10:13:15), and stores the CM2 additional data 601 corresponding to the message ID "102" included in the event message 1703, into the memory.

(4) In the display 1402, the reception apparatus 132 displays the CM1 material 301 contained in the program data stream 1301 in the top right display region on the TV 133 at 10:14:00, and at the same time receives the event message 1304 and displays the CM1 additional data 501 corresponding to the message ID "101" in the event message 1304, in the bottom left L-shaped display region on the TV 133.

(5) In the display 1403, the reception apparatus 132 displays the CM2 material 302 contained in the program data stream 1301 in the top right display region on the TV 133 at 10:14:15, and at the same time receives the event message 1305 and displays the CM2 additional data 601 corresponding to the message ID "102" in the event message 1305, in the bottom left L-shaped display region on the TV 133.

(6) After the presentation of the CM1 additional data 501 has ended, the reception apparatus 132 receives the event message 1704 and sets the CM1 additional data 501 deletable from the memory.

(7) In the display 1404, the reception apparatus 132 displays the drama A second material 202 contained in the program data stream 1301 in the top right display region on the TV 133 at 10:14:30, and at the same time receives the event message 1306 and displays the drama A additional data ① 401 corresponding to the message ID "100" in the event message 1306, in the bottom left L-shaped display region on the TV 133.

(8) After the presentation of the CM2 additional data 601 has ended, the reception apparatus 132 receives the event message 1705 and sets the CM2 additional data 601 deletable from the memory.

(9) The reception apparatus 132 receives the event message 1706 N minutes before 10:29:45 (e.g. 10:28:45), and stores the CM3 additional data 701 corresponding to the message ID "103" included in the event message 1706, into the memory.

(10) In the display 1405, the reception apparatus 132 displays the CM3 material 303 contained in the program data stream 1301 in the top right display region on the TV 133 at 10:29:45, and at the same time receives the event message 1307 and displays the CM3 additional data 701 corresponding to the message ID "103" included in the event message 1307, in the bottom left L-shaped display region on the TV 133.

(11) After the presentation of the CM3 additional data 701 has ended, the reception apparatus 132 receives the event message 1707 and sets the CM3 additional data 701 deletable from the memory.

According to this embodiment, the broadcast apparatus broadcasts event messages for indicating storage and deletion of additional data, so that the reception apparatus can store necessary additional data only when it is required, in accordance with the event messages. This has the effect of economizing on memory usage in the reception apparatus.

Modification (Overview)

A broadcast apparatus according to a modification to the invention operates in the same way as that in the first or second embodiment, by broadcasting modules instead of event messages.

(Construction)

FIG. 18 is a block diagram of a construction of a broadcast system to which the modification of the invention relates.

This broadcast system is roughly made up of a broadcast apparatus 140 and a reception apparatus 152.

The drawing also shows a TV 153 for presenting programs and data to the viewer based on a data broadcast received by the reception apparatus 152.

Note here that construction elements which are the same as those in the first and second embodiments shown in FIGS. 1 and 15 have been given the same reference numerals and their explanation has been omitted.

The broadcast apparatus 140 includes the main AV material holding unit 101, the CM AV material holding unit 102, the main data material holding unit 103, the CM data material holding unit 104, the organization information managing unit 105, a transmission controlling unit 146, the AV transmitting unit 107, the carousel generating unit 108, the carousel transmitting unit 109, a dummy module transmitting unit 150, and a multiplexing unit 151.

The transmission controlling unit 146 controls the dummy module transmitting unit 150, in the same way as the transmission controlling unit 106 controls the event message transmitting unit 110 in the first embodiment or the transmission controlling unit 126 controls the event message transmitting unit 130 in the second embodiment.

The dummy module transmitting unit 150 generates a module which indicates to present a data material specified by a name given from the transmission controlling unit 146, and passes it to the multiplexing unit 151, in accordance with an instruction from the transmission controlling unit 146.

The dummy module transmitting unit 150 also generates a module which indicates to store a data material specified by a name given from the transmission controlling unit 146, and a module which indicates to set deletable a data material whose presentation has ended, and passes them to the multiplexing unit 151.

Each module generated by the dummy module transmitting unit 150 here has a particular module ID.

The multiplexing unit 151 multiplexes the AV material given from the AV transmitting unit 107 and the carousel data given from the carousel transmitting unit 109 to generate a data stream, and broadcasts the data stream to the reception apparatus 152. Only when given a module from the dummy module transmitting unit 150, the multiplexing unit 151 adds the module to the carousel data before multiplexing it with the AV material.

The reception apparatus 152 receives the data stream broadcasted by the broadcast apparatus 140, and displays a program of the AV material multiplexed in the data stream on the TV 153. The reception apparatus 152 also monitors whether any modules are added to the carousel data multiplexed in the data stream. When detecting that the modules are added to the carousel data, the reception apparatus 152 displays on the TV 153 detailed information on the program based on the data materials contained in the carousel data multiplexed in the data stream, while storing, switching, and deleting such information in accordance with module IDs of such modules.

(Operation)

An operation of the broadcast system in this modification is similar to those in the first and second embodiments, so that its explanation has been omitted.

According to the modification of the invention, the broadcast apparatus uses a module instead of an event message to indicate to the reception apparatus to execute an event such as storage, switching, or deletion of a data material.

Accordingly, when the number of event messages which can be used is limited, the event messages can be saved by not using them for indicating storage, switching, and deletion of data materials, with it being possible to utilize as many event messages as possible for other purposes.

The above embodiments and modification describe the case where an event message or module for indicating an operation is sent to the reception apparatus only once, but the same event message or module may be sent several times in case where the reception apparatus fails to receive it.

Also, programs that execute the above embodied and modified operations on a computer may be distributed for transactions, via computer-readable recording media or networks.

The computer-readable recording media mentioned here may be removable recording media such as floppy disks, CDs, MOs, DVDs, and memory cards, or fixed recording media such as hard disks and semiconductor memories.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data broadcast apparatus for repeatedly broadcasting broadcast data using a carousel method, to a reception apparatus which stores the broadcast data into a memory and reproduces the broadcast data stored in the memory, comprising:

acquiring means for acquiring a plurality of sets of broadcast data for each of which a reproduction start time is specified;

generating means for generating carousel data including the plurality of sets of broadcast data acquired by the acquiring means;

controlling means for controlling the operation of the data broadcast apparatus, the controlling means including a clock for managing operational timing and issuing instructions;

carousel data broadcasting means for repeatedly broadcasting the carousel data using the carousel method, according to the operation instruction from the controlling means; and instruction broadcasting means for broadcasting, for each set of broadcast data, a reproduction instruction to start reproduction of the set of broadcast data, according to the operation instruction from the controlling means, wherein the controlling means (i) instructs the carousel data broadcasting means to start broadcasting the carousel data at an earliest one of a plurality of reproduction start times of the plurality of sets of broadcast data, and (ii) instructs the instruction broadcasting means to broadcast the reproduction instruction at a reproduction start time of the set of broadcast data.

2. The data broadcast apparatus of claim 1, wherein the instruction broadcasting means further broadcasts a storage instruction to store the set of broadcast data into the memory, according to the operation instruction from the controlling means, and the controlling means further instructs the instruction broadcasting means to broadcast the storage instruction a first predetermined time before the reproduction start time.

3. The data broadcast apparatus of claim 2, wherein the instruction broadcasting means further broadcasts a deletion instruction which indicates to the reception apparatus that the set of broadcast data can be deleted from the memory, according to the operation instruction from the controlling means, and the controlling means further instructs the instruction broadcasting means to broadcast the deletion instruction a second predetermined time after the reproduction start time.

4. The data broadcast apparatus of claim 1, wherein the instruction broadcasting means broadcasts the reproduction instruction as an event message or a module which has a particular identifier.

5. A data broadcast apparatus for (a) continuously broadcasting program data during a broadcast time slot to a reception apparatus, and (b) repeatedly broadcasting additional data associated with the program data during the broadcast time slot using a carousel method, to the reception apparatus which stores the additional data into a memory and reproduces the additional data stored in the memory, comprising:

acquiring means for acquiring a plurality of sets of program data for each of which a broadcast time slot is specified, and a plurality of sets of additional data which are respectively associated with the plurality of sets of program data;

generating means for generating carousel data including the plurality of sets of additional data acquired by the acquiring means;

controlling means for controlling the operation of the data broadcast apparatus, the controlling means including a clock for managing operational timing and issuing instructions;

data broadcasting means for
(a) continuously broadcasting, during a broadcast time slot of each set of program data, the set of program data, and
(b) repeatedly broadcasting the carousel data using the carousel method, according to the operation instruction from the controlling means; and instruction broadcasting means for broadcasting, for each set of additional data, a reproduction instruction to start reproduction of the set of additional data, according to the operation instruction from the controlling means, wherein the controlling means (i) instructs the data broadcasting means to start broadcasting the carousel data at the start of an earliest one of a plurality of broadcast time slots of the plurality of sets of program data, and (ii) instructs the instruction broadcasting means to broadcast the reproduction instruction at the start of a broadcast time slot of a set of program data associated with the set of additional data.

6. The data broadcast apparatus of claim 5, wherein the instruction broadcasting means further broadcasts a storage instruction to store the set of additional data into the memory, according to the operation instruction from the controlling means, and the controlling means further instructs the instruction broadcasting means to broadcast the storage instruction a first predetermined time before the start of the broadcast time slot.

7. The data broadcast apparatus of claim 6, wherein the instruction broadcasting means further broadcasts a deletion instruction which indicates to the reception apparatus that the set of additional data can be deleted from the memory, and the controlling means further instructs the instruction broadcasting means to broadcast the deletion instruction a second predetermined time after the start of the broadcast time slot.

8. The data broadcast apparatus of claim 5, wherein the instruction broadcasting means broadcasts the reproduction instruction as an event message or a module which has a particular identifier.

9. A computer program embodied on a computer readable medium for use with a data broadcast apparatus including a clock, for repeatedly broadcasting broadcast data using a carousel method to a reception apparatus which stores the broadcast data into a memory and reproduces the broadcast data stored in the memory, the computer program comprising:

an acquiring step for acquiring a plurality of sets of broadcast data for each of which a reproduction start time is specified;

a generating step for generating carousel data including the plurality of sets of broadcast data acquired in the acquiring step;

a controlling step for controlling an overall operation of the data broadcast apparatus, by managing a time at which each step is to be executed and issuing an operation instruction for each step;

a carousel data broadcasting step for repeatedly broadcasting the carousel data using the carousel method, according to the operation instruction in the controlling step; and an instruction broadcasting step for broadcasting, for each set of broadcast data, a reproduction instruction to start reproduction of the set of broadcast data, according to the operation instruction in the controlling step, wherein the controlling step (i) instructs the carousel data broadcasting step to start broadcasting the carousel data at an earliest one of a plurality of reproduction start times of the plurality of sets of broadcast data, and (ii) instructs the instruction broadcasting step to broadcast the reproduction instruction at a reproduction start time of the set of broadcast data.

10. A computer program embodied on a computer readable medium for use with a data broadcast apparatus including a clock, for (a) continuously broadcasting program data during a broadcast time slot to a reception apparatus, and (b) repeatedly broadcasting additional data associated with the program data during the broadcast time slot using a carousel method, to the reception apparatus which stores the additional data into a memory and reproduces the additional data stored in the memory, the computer program comprising:

an acquiring step for acquiring a plurality of sets of program data for each of which a broadcast time slot is specified, and a plurality of sets of additional data which are respectively associated with the plurality of sets of program data;

a generating step for generating carousel data including the plurality of sets of additional data acquired in the acquiring step;

a controlling step for controlling an overall operation of the data broadcast apparatus, by managing a time at which each step is to be executed and issuing an operation instruction for each step;

a data broadcasting step for
(a) continuously broadcasting, during a broadcast time slot of each set of program data, the set of program data, and
(b) repeatedly broadcasting the carousel data using the carousel method, according to the operation instruction in the controlling step; and an instruction broadcasting step for broadcasting, for each set of additional data, a reproduction instruction to start reproduction of the set of additional data, according to the operation instruction in the controlling step, wherein the controlling step (i) instructs the data broadcasting step to start broadcasting the carousel data at the start of an earliest one of a plurality of broadcast time slots of the plurality of sets of program data, and (ii) instructs the instruction broadcasting step to broadcast the reproduction instruction at the start of a broadcast time slot of a set of program data associated with the set of additional data.

11. A data broadcast method for use with a data broadcast apparatus including a clock, for repeatedly broadcasting broadcast data using a carousel method to a reception apparatus which stores the broadcast data into a memory and reproduces the broadcast data stored in the memory, the data broadcast method comprising:

an acquiring step for acquiring a plurality of sets of broadcast data for each of which a reproduction start time is specified;

a generating step for generating carousel data including the plurality of sets of broadcast data acquired in the acquiring step;

a controlling step for controlling an overall operation of the data broadcast apparatus, by managing a time at which each step is to be executed and issuing an operation instruction for each step;

a carousel data broadcasting step for repeatedly broadcasting the carousel data using the carousel method, according to the operation instruction in the controlling step; and an instruction broadcasting step for broadcasting, for each set of broadcast data, a reproduction instruction to start reproduction of the set of broadcast data, according to the operation instruction in the controlling step, wherein the controlling step (i) instructs the carousel data broadcasting step to start broadcasting the carousel data at an earliest one of a plurality of reproduction start times of the plurality of sets of broadcast data, and (ii) instructs the instruction broadcasting step to broadcast the reproduction instruction at a reproduction start time of the set of broadcast data.

12. A data broadcast method for use with a data broadcast apparatus including a clock, for (a) continuously broadcasting program data during a broadcast time slot to a reception apparatus, and (b) repeatedly broadcasting additional data associated with the program data during the broadcast time slot using a carousel methods, to the reception apparatus which stores the additional data into a memory and reproduces the additional data stored in the memory, the data broadcast method comprising:

an acquiring step for acquiring a plurality of sets of program data for each of which a broadcast time slot is specified, and a plurality of sets of additional data which are respectively associated with the plurality of sets of program data;

a generating step for generating carousel data including the plurality of sets of additional data acquired in the acquiring step;

a controlling step for controlling an overall operation of the data broadcast apparatus, by managing a time at which each step is to be executed and issuing an operation instruction for each step;

a data broadcasting step for
  (a) continuously broadcasting, during a broadcast time slot of each set of program data, the set of program data, and
  (b) repeatedly broadcasting the carousel data using the carousel method, according to the operation instruction in the controlling step; and an instruction broadcasting step for broadcasting, for each set of additional data, a reproduction instruction to start reproduction of the set of additional data, according to the operation instruction in the controlling step, wherein the controlling step (i) instructs the data broadcasting step to start broadcasting the carousel data at the start of an earliest one of a plurality of broadcast time slots of the plurality of sets of program data, and (ii) instructs the instruction broadcasting step to broadcast the reproduction instruction at the start of a broadcast time slot of a set of program data associated with the set of additional data.

* * * * *